US012677196B2

(12) United States Patent
Zhou et al.

(10) Patent No.: US 12,677,196 B2
(45) Date of Patent: Jul. 7, 2026

(54) CELL ACTIVATION ORDER FOR L1/L2 BASED INTER-CELL MOBILITY

(71) Applicant: QUALCOMM Incorporated, San Diego, CA (US)

(72) Inventors: Shanyu Zhou, San Diego, CA (US); Jelena Damnjanovic, Del Mar, CA (US); Changhwan Park, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 386 days.

(21) Appl. No.: 18/447,765

(22) Filed: Aug. 10, 2023

(65) Prior Publication Data

US 2024/0073750 A1      Feb. 29, 2024

Related U.S. Application Data

(60) Provisional application No. 63/374,114, filed on Aug. 31, 2022.

(51) Int. Cl.
*H04W 36/08* (2009.01)
*H04B 7/024* (2017.01)
*H04W 36/00* (2009.01)

(52) U.S. Cl.
CPC ........ *H04W 36/0061* (2013.01); *H04B 7/024* (2013.01)

(58) Field of Classification Search
CPC .................................................... H04W 36/00
See application file for complete search history.

(56) References Cited

U.S. PATENT DOCUMENTS

2013/0083707 A1* 4/2013 Wang ..................... H04W 72/23
                                                                          370/280
2024/0406811 A1* 12/2024 Zhang ............. H04W 36/00835

* cited by examiner

*Primary Examiner* — Michael T Vu
(74) *Attorney, Agent, or Firm* — Procopio, Cory, Hargreaves & Savitch LLP

(57) ABSTRACT

An apparatus for wireless communication at a UE is provided. The apparatus is configured to receive a layer 1 (L1) or layer 2 (L2) mobility cell configuration for a set of cells for L1 or L2 inter-cell mobility. The set of cells include multiple cells, and each cell in the set of cells is able to be activated or deactivated for data and/or control transfer using L1 or L2 signaling. The apparatus is further configured to receive L1 or L2 signaling indicating multiple activated cells, and activate one or more cells in the multiple activated cells in the priority order for the data and/or control transfer using L1 or L2 signaling. The apparatus provides configuration, cell activation or deactivation in an optimized order, and associated signaling to enable L1/L2 mobility for more efficient and robust mobility management.

30 Claims, 15 Drawing Sheets

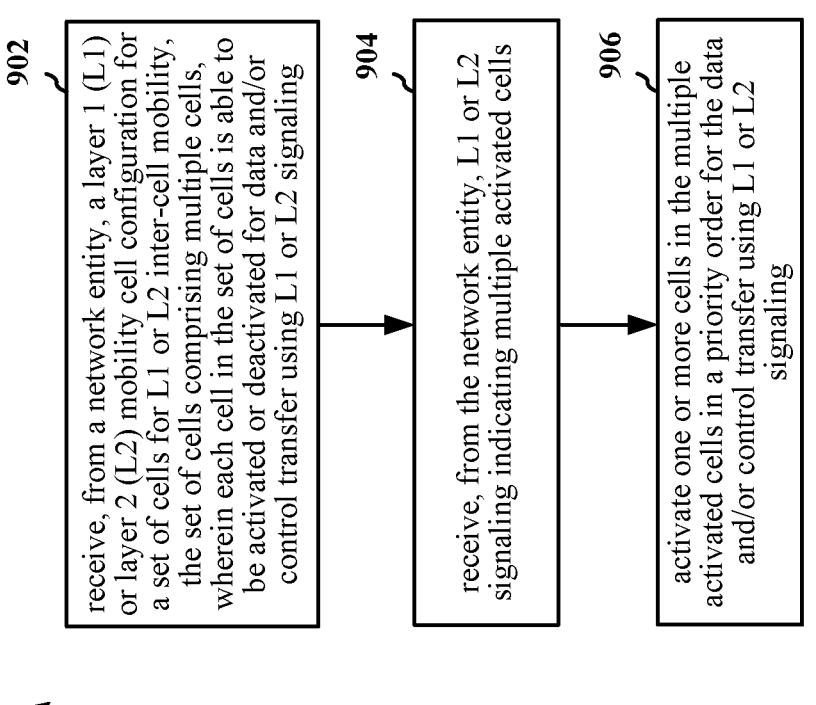

902 receive, from a network entity, a layer 1 (L1) or layer 2 (L2) mobility cell configuration for a set of cells for L1 or L2 inter-cell mobility, the set of cells comprising multiple cells, wherein each cell in the set of cells is able to be activated or deactivated for data and/or control transfer using L1 or L2 signaling

904 receive, from the network entity, L1 or L2 signaling indicating multiple activated cells

906 activate one or more cells in the multiple activated cells in a priority order for the data and/or control transfer using L1 or L2 signaling

1102 transmit, to a user equipment (UE), a layer 1 (L1) or layer 2 (L2) mobility cell configuration for a set of cells for L1 or L2 inter-cell mobility, the set of cells comprising multiple cells, wherein each cell in the set of cells is able to be activated or deactivated for data and/or control transfer using L1 or L2 signaling

1104 transmit, to the UE, L1 or L2 signaling indicating multiple activated cells, wherein the UE is configured to activate one or more cells in the multiple activated cells in a priority order for the data and/or control transfer using L1 or L2 signaling

FIG. 11

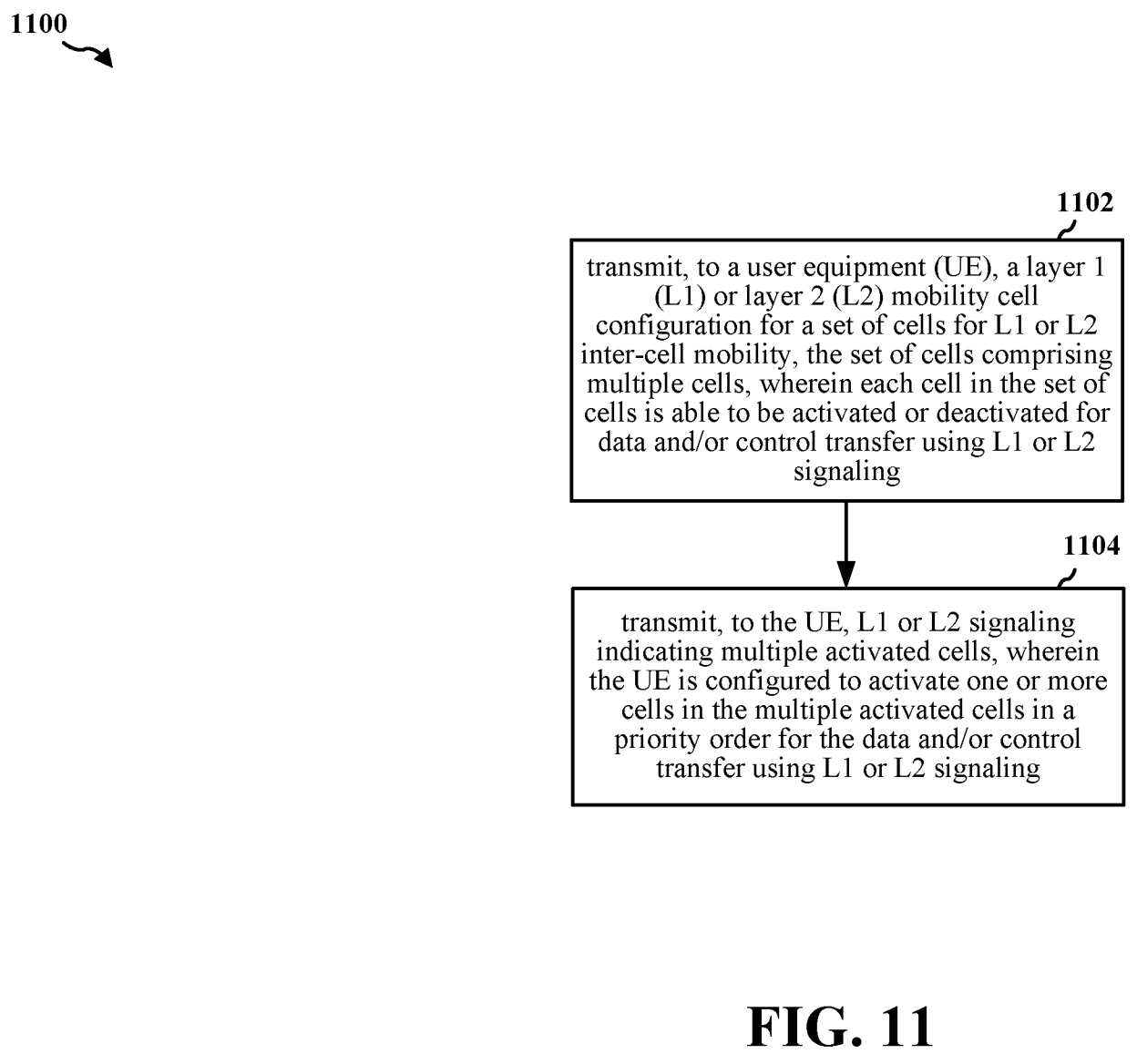

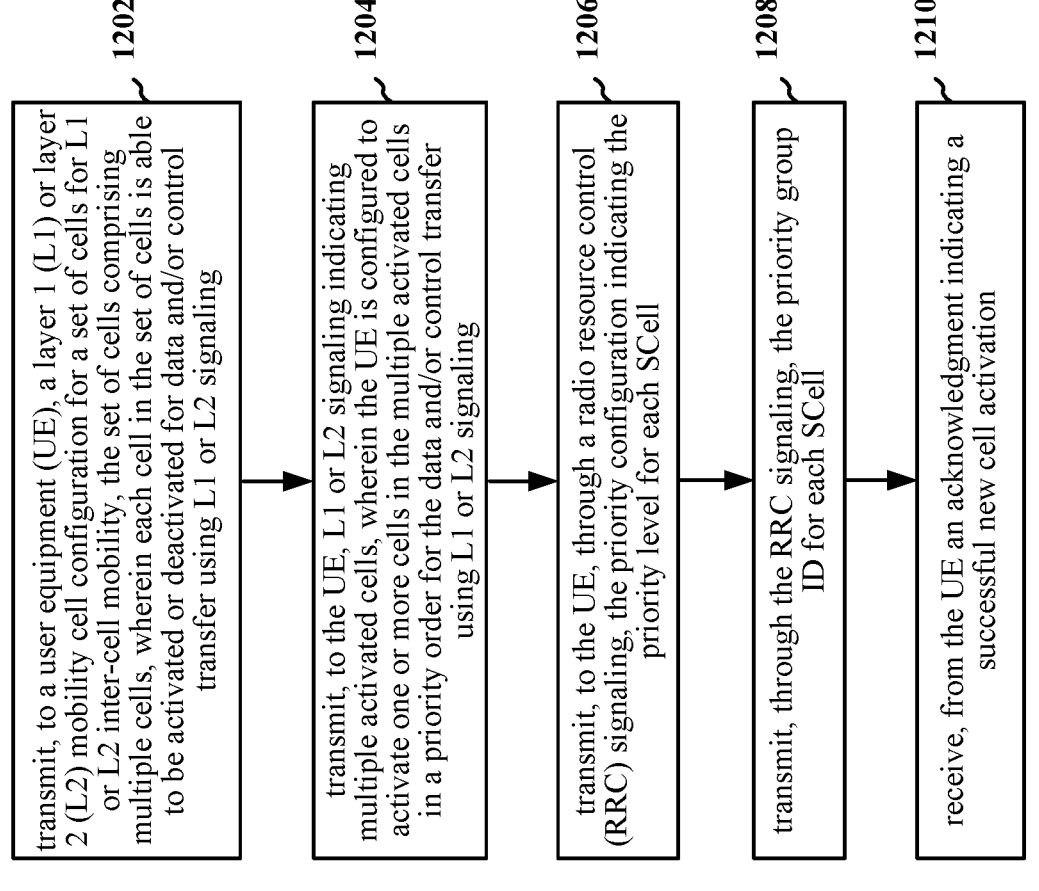

transmit, to a user equipment (UE), a layer 1 (L1) or layer 2 (L2) mobility cell configuration for a set of cells for L1 or L2 inter-cell mobility, the set of cells comprising multiple cells, wherein each cell in the set of cells is able to be activated or deactivated for data and/or control transfer using L1 or L2 signaling ⟍ 1202 transmit, to the UE, L1 or L2 signaling indicating multiple activated cells, wherein the UE is configured to activate one or more cells in the multiple activated cells in a priority order for the data and/or control transfer using L1 or L2 signaling ⟍ 1204 transmit, to the UE, through a radio resource control (RRC) signaling, the priority configuration indicating the priority level for each SCell ⟍ 1206 transmit, through the RRC signaling, the priority group ID for each SCell ⟍ 1208 receive, from the UE an acknowledgment indicating a successful new cell activation ⟍ 1210

CELL ACTIVATION ORDER FOR L1/L2 BASED INTER-CELL MOBILITY

CROSS REFERENCE TO RELATED APPLICATION(S)

This application claims the benefit of and priority to U.S. Provisional Application No. 63/374,114, entitled "CELL ACTIVATION ORDER FOR L1/L2 Based Inter-Cell Mobility" and filed on Aug. 31, 2022, which is expressly incorporated by reference herein in its entirety.

TECHNICAL FIELD

The present disclosure relates generally to communication systems, and more particularly, to cell activation/deactivation for L1/L2 mobility management.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include at least one memory and at least one processor coupled to the at least one memory. Based at least in part on information stored in the at least one memory, the at least one processor may be configured to: receive, from a network entity, a layer 1 (L1) or layer 2 (L2) mobility cell configuration for a set of cells for L1 or L2 inter-cell mobility. The set of cells may include multiple cells, and each cell in the set of cells is able to be activated or deactivated for data and/or control transfer using L1 or L2 signaling. The at least one processor may be further configured to receive, from the network entity, L1 or L2 signaling indicating multiple activated cells; and activate one or more cells in the multiple activated cells in the priority order for the data and/or control transfer using L1 or L2 signaling.

In some aspects of the disclosure, a method, a computer-readable medium, and an apparatus are provided. The apparatus may transmit, to a user equipment (UE), and L1 or L2 mobility cell configuration for a set of cells for L1 or L2 inter-cell mobility, the set of cells comprising multiple cells, wherein each cell in the set of cells is able to be activated or deactivated for data and/or control transfer using L1 or L2 signaling; and transmit, to the UE, L1 or L2 signaling indicating multiple activated cells, wherein the UE is configured to activate one or more cells in the multiple activated cells in a priority order for the data and/or control transfer using L1 or L2 signaling.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9 is a first flowchart of a method of wireless communication at a UE in accordance with various aspects of the present disclosure.

FIG. 11 is a first flowchart of a method of wireless communication at a network entity in accordance with various aspects of the present disclosure.

FIG. 12 is a second flowchart of a method of wireless communication at a network entity in accordance with various aspects of the present disclosure.

DETAILED DESCRIPTION

Figure 1:
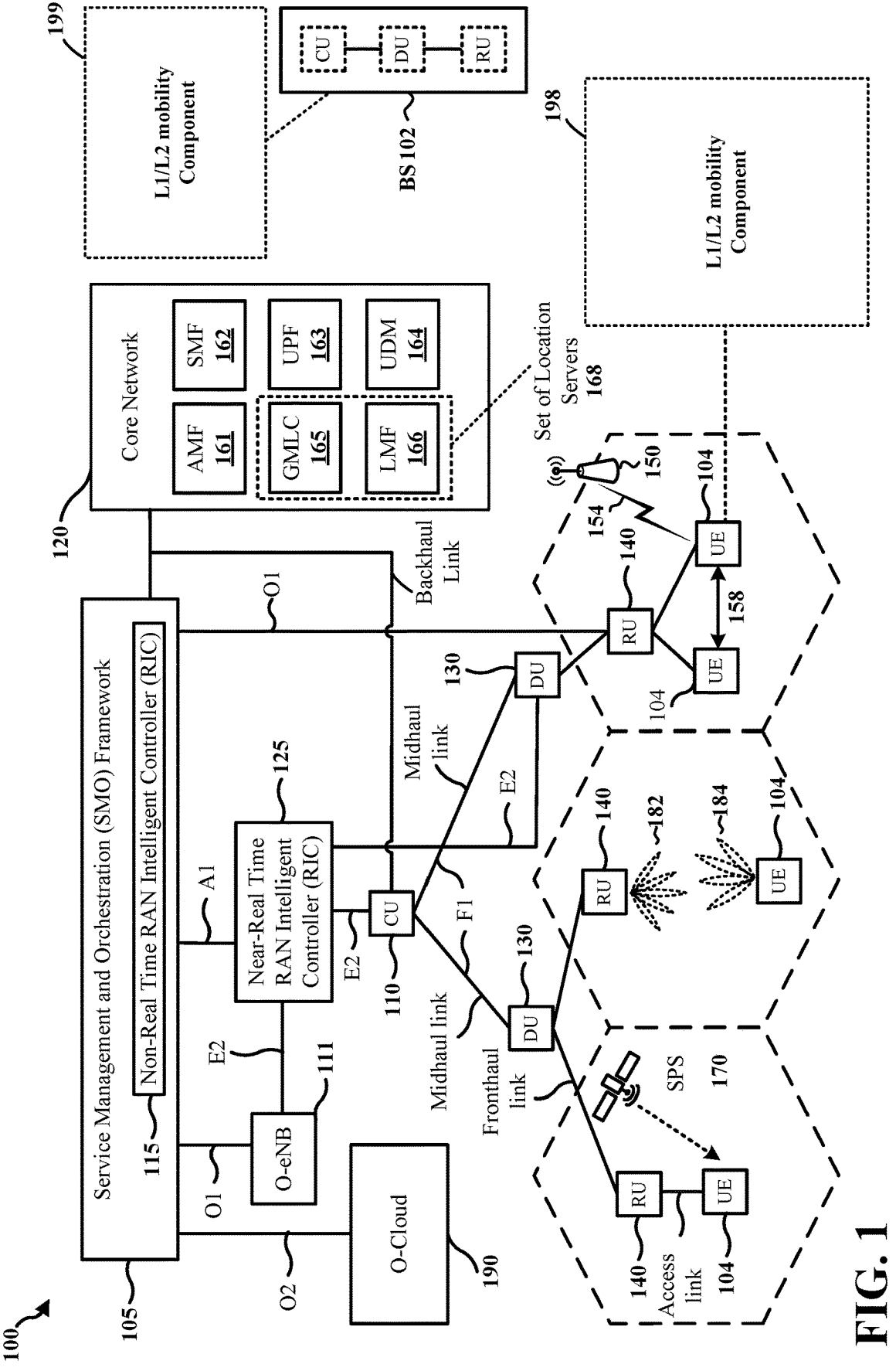
FIG. 1 is a diagram illustrating an example of a wireless communications system and an access network.

A UE may receive a configuration of cells that may be activated for L1 or L2 inter-cell mobility. From the cells configured for L1/L2 inter-cell mobility, the UE may receive control signaling activating multiple cells. Mobility within the configured set of cells may be performed through L1/L2 signaling that allows a quicker activation and deactivation of particular cells in the configured set of cells, e.g., than L3 signaling. The UE may provide L1/L2 measurements or reports for the activated cells, and the activated cells may be readily used for data and/or control signaling with a network. When the UE receives an activation of multiple cells in the configured set of cells for L1/L2 inter-cell mobility, the aspects presented herein enable the UE to determine an order of activation among the multiple cells.

Various aspects are related generally to communication systems, and more particularly, to cell activation/deactivation for L1/L2 mobility management. In some aspects, a UE may receive, from a network entity, the L1 or L2 mobility cell configuration for a set of cells for L1 or L2 inter-cell mobility, the set of cells including multiple cells. Each cell in the set of cells may be able to be activated or deactivated for data and/or control transfer using L1 or L2 signaling. The UE may further receive, from the network entity, L1 or L2 signaling indicating multiple activated cells, and activate one or more cells in the multiple activated cells in a priority order for the data and/or control transfer using L1 or L2 signaling. As presented herein, the activation order may take into consideration whether an activated cell is an SpCell or an SCell, in some aspects. As presented herein, the activation order may address a UE capability, a network preference, a network requirement, and/or other factors.

Particular aspects of the subject matter described in this disclosure can be implemented to realize one or more of the following potential advantages. In some examples, by activating the cells according to the optimized activation order, the described techniques can be used to enable a UE to activate the more important cell(s) first, which brings technical benefits such as improved quality of services, enhanced user experience, improved latency, and reduced power consumption.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer-executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspects. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitutions.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smartphone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meters, gas pumps, toasters, vehicles, heart monitors, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an L1/L2 mobility component 198 that is configured to receive, from a network entity (e.g., a base station 102 or a component of a base station such as a CU 110, a DU 130, and/or an RU 140), an L1 or L2 mobility cell configuration for a set of cells for L1 or L2 inter-cell mobility; receive, from the network entity, L1 or L2 signaling indicating multiple activated cells; and activate one or more cells in the multiple activated cells in the priority order for the data and/or control transfer using L1 or L2 signaling. In certain aspects, the base station 102 (or a component of the base station 102, such as the CU 110, the DU 130, and/or the RU 140) may include an L1/L2 mobility component 199 configured to transmit, to a UE 104, and L1 or L2 mobility cell configuration for a set of cells for L1 or L2 inter-cell mobility, the set of cells comprising multiple cells, wherein each cell in the set of cells is able to be activated or deactivated for data and/or control transfer using L1 or L2 signaling; and transmit, to the UE, L1 or L2 signaling indicating multiple activated cells, wherein the UE is configured to activate one or more cells in the multiple activated cells in a priority order for the data and/or control transfer using L1 or L2 signaling. The apparatus provides configuration, cell activation or deactivation in an optimized order, and associated signaling to enable L1/L2 mobility for more efficient and robust mobility management. By activating the cells according to the optimized activation order, a UE may activate the more important cell(s) first, which brings technical benefits such as improved quality of services, enhanced user experience, improved latency, and reduced power consumption. Although the following description may be focused on 5G NR, the concepts described herein may be applicable to other similar areas, such as LTE, LTE-A, CDMA, GSM, and other wireless technologies.

Figures 2A, 2B, 2C, 2D:
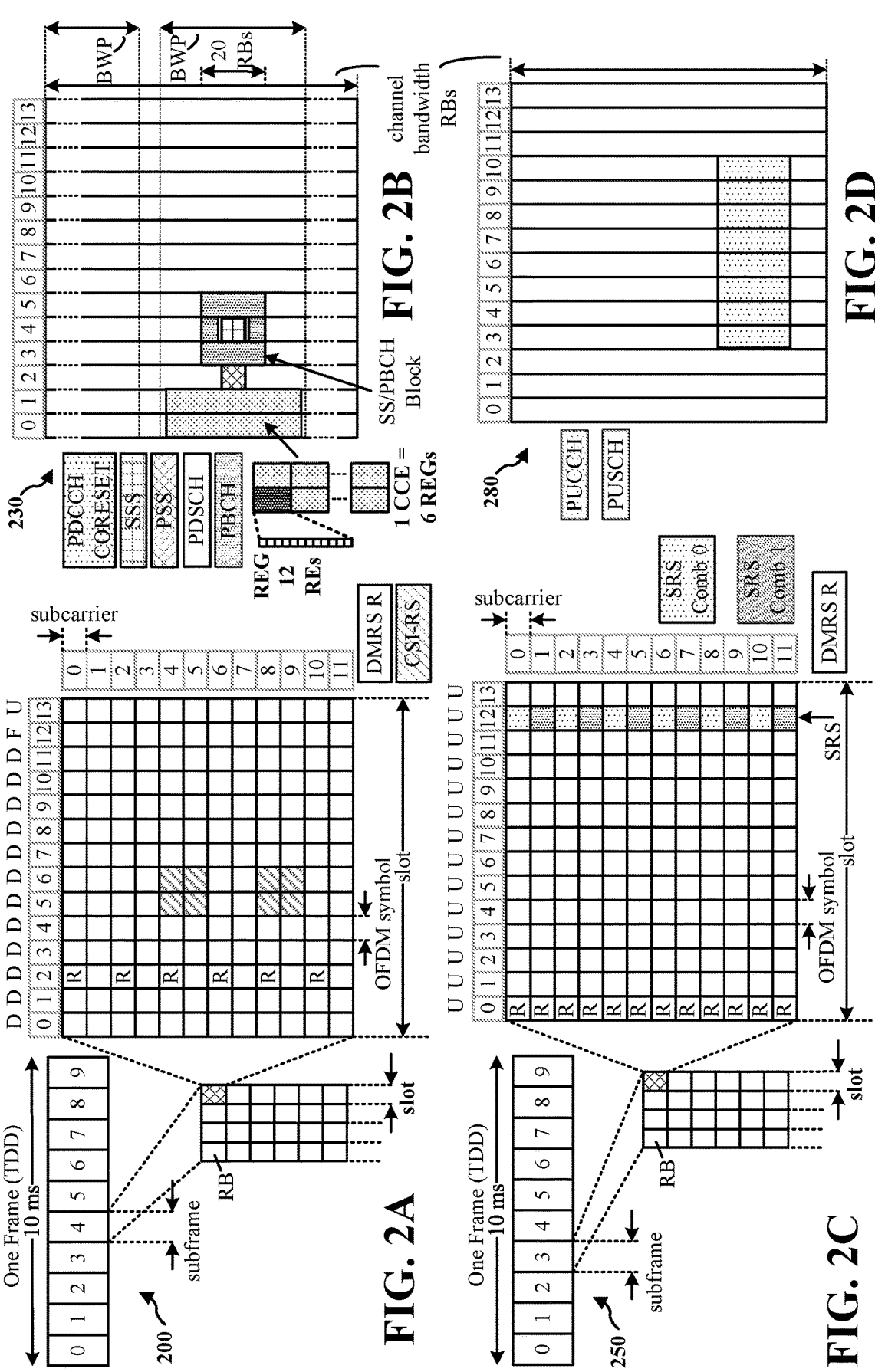
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^\mu \cdot 15[kHz]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology it, there are 14 symbols/slot and 2 g slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI- RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
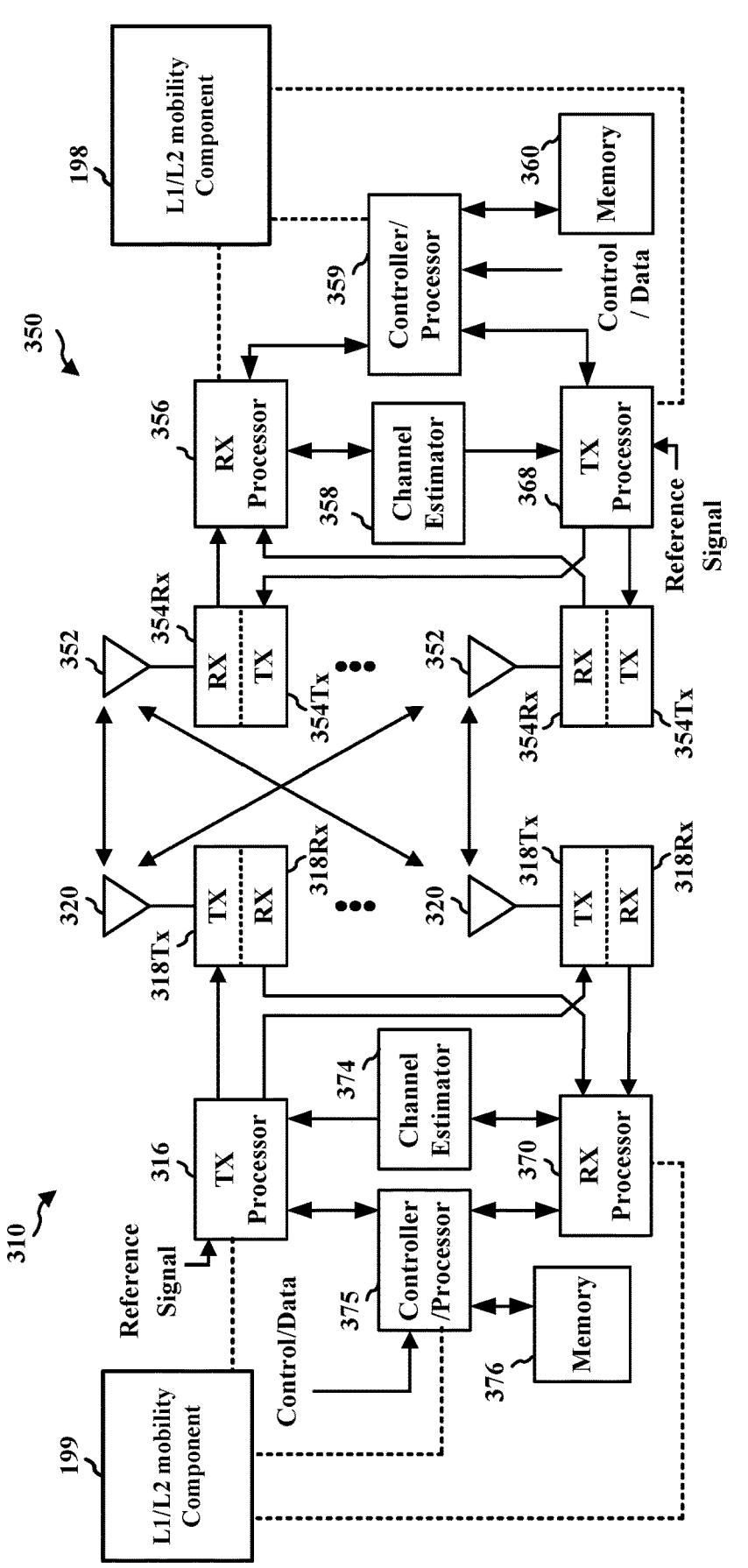
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the L1/L2 mobility component 198 of FIG. 1.

At least one of the TX processor 316, the RX processor 370, and the controller/processor 375 may be configured to perform aspects in connection with the L1/L2 mobility component 199 of FIG. 1.

A network may be in communication with a UE based on one or more beams (spatial filters). For example, a base station of the network may transmit a beamformed signal to a UE in one or more directions that correspond with one or more beams. The base station and the UE may perform beam training to determine the best receive and transmit directions for the base station and the UE.

In response to different conditions, beams may be switched. For example, a transmission configuration indication (TCI) state change may be transmitted by a base station so that the UE may switch to a new beam for the TCI state. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication. A TCI state may include quasi co-location (QCL) information that the UE can use to derive timing/frequency error and/or transmission/reception spatial filtering for transmitting/receiving a signal.

Figures 4A, 4B:
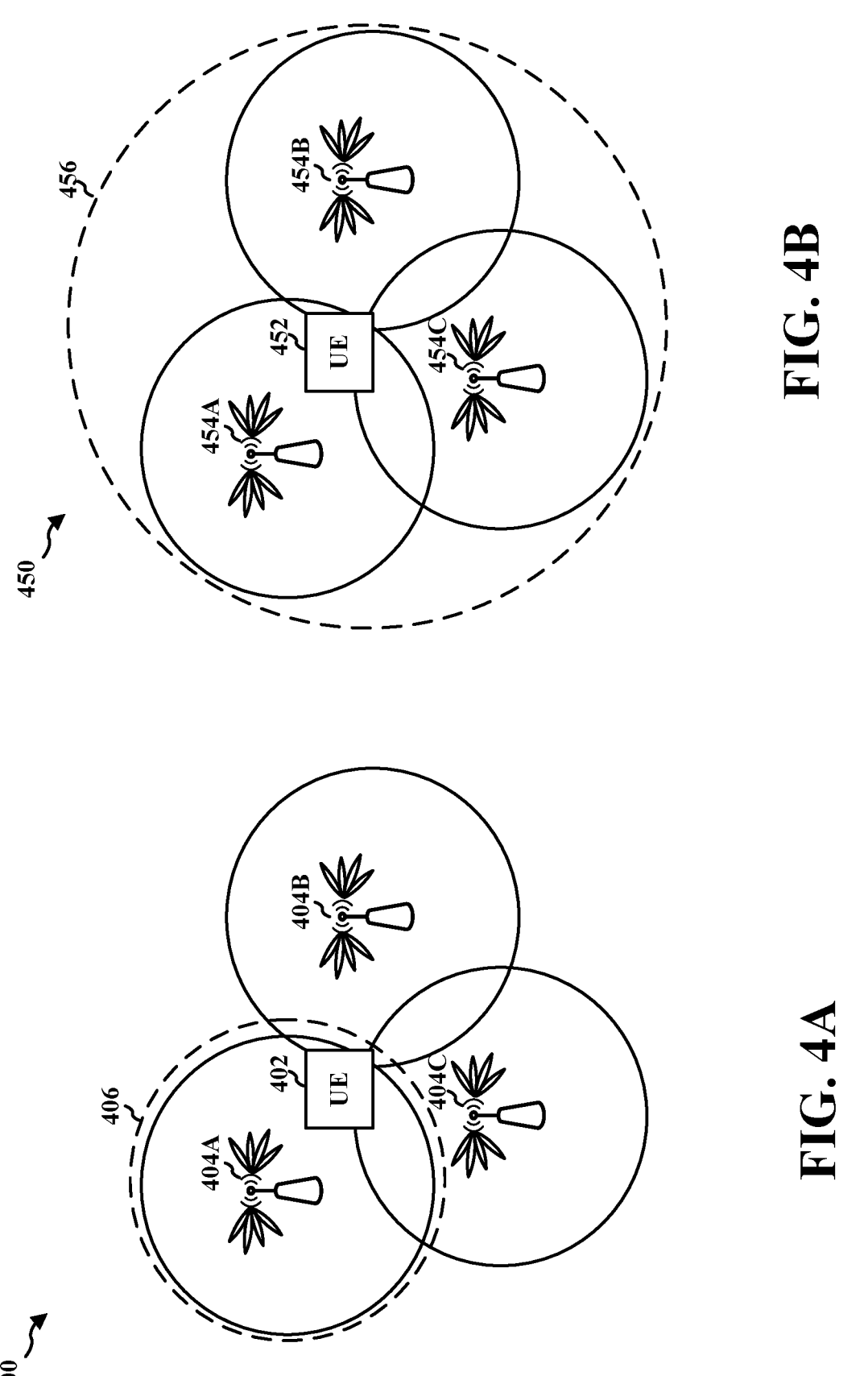
FIG. 4A is a diagram illustrating an example beam management.
FIG. 4B is a diagram illustrating an example inter-cell beam management.

Different procedures for managing and controlling beam may be collectively referred to as "beam management." The process of selecting a beam to switch to for data channels or control channels may be referred to as "beam selection." In some wireless communication systems, beam selection for data channels or control channels may be limited to beams within the same physical cell identifier (ID) (PCI). A PCI may be associated with a TRP. FIG. 4A is a diagram 400 illustrating example aspects of beam management. As illustrated in FIG. 4A, for a UE 402, beam selection 406 may be limited to beams within the PCI 404A and beams associated with the PCI 404B and the PCI 404C may not be used. As an example, each of the PCI 404A, the PCI 404B, and the PCI 404C may be associated with a different TRP.

By way of example, a UE may encounter two types of mobility—cell-level mobility and beam-level mobility (which may be beam-based mobility). For cell-level mobility, a UE may experience an inter-base station handover, e.g., from a first base station to a second base station. In some wireless communication systems, for beam-level mobility, as previously explained, switching of beams may occur while being served by a same base station.

In some wireless communication systems, inter-cell beam management may be based on beam-based mobility where the indicated beam may be from a TRP with different PCI with regard to the serving cell. Benefits of inter-cell beam management based on beam-based mobility may include more robustness against blocking, more opportunities for higher rank for subscriber data management (SDM) across different cells, and in general more efficient communication between a UE and the network. FIG. 4B is a diagram 450 illustrating an example inter-cell beam management. As illustrated in FIG. 4B, for a UE 452, beam selection 456 may be based on beams within the PCI 454A and beams associated with the PCI 454B and the PCI 454C. As an example, each of the PCI 454A, the PCI 454B, and the PCI 454C may be associated with a different TRP.

As an example, inter-cell beam management based on beam-based mobility may be facilitated by L1 and/or L2 signaling such as UE-dedicated channels/RS s which may be associated with a switch to a TRP with different PCI according to downlink control information (DCI) or medium access control (MAC) control element (MAC-CE) based unified TCI update. As used herein, such mobility may be referred to as L1/L2 mobility.

In some aspects, the network may configure a set of cells for L1/L2 mobility. The set of cells for L1/L2 mobility may be referred to as an L1/L2 mobility configured cell set. A subset of the L1/L2 mobility configured cell set may be activated (e.g., with L1 or L2 control signaling) and may be referred to as an L1/L2 mobility activated cell set (which may also be referred to as an L1/L2 activated mobility cell set). The subset of the L1/L2 mobility configured cell set that are not activated or that are indicated to be deactivated may be referred to as an L1/L2 mobility deactivated cell set or a deactivated L1/L2 mobility cell set, for example. The L1/L2 mobility activated cell set may be a group of cells in the L1/L2 mobility configured cell set that are activated and may be readily used for data and control transfer. The L1/L2 mobility deactivated cell set (which may be an L1/L2 mobility candidate cell set) may be a group of cells in the configured set that are configured for the UE, yet are deactivated (e.g., not used for data/control transfer until activated). The cells in the L1/L2 mobility deactivated cell set may be activated by L1/L2 signaling. Once activated, the UE may use the activated cell for data and control transfer, e.g., to transmit and receive data and/control messages with the base station. The configuration and maintenance of multiple candidate cells may allow for a quicker application of configurations for the candidate cells, and the activated set of cells may provide for dynamic switching among the candidate serving cells (e.g., including an SpCell and SCell) based on L1 or L2 signaling.

The procedures of L1/L2 based inter-cell mobility are applicable to many scenarios. These scenarios may include, but are not limited to, standalone CA and NR-DC cases with serving cell changing within one CG, intra-DU cases and intra-CU inter-DU cases (applicable for standalone and CA, with no new RAN interface expected), intra-frequency and inter-frequency cases, FR1 and FR2 cases. In these scenarios, the source and target cells may be synchronized or non-synchronized.

For mobility management of the activated cell set, L1/L2 signaling may be used to activate/deactivate cells in the L1/L2 mobility configured cell set and to select beams within the activated cells (of the activated cell set). As the UE moves, cells from the L1/L2 mobility configured cell set may be deactivated and activated by L1/L2 signaling based on signal quality (e.g., based on measurements), loading, or the like. Example measurements may include cell coverage measurements represented by Radio Signal Received Power (RSRP), and quality represented by Radio Signal Received Quality (RSRQ), or other measurements that the UE performs on signals from the base station. In some aspects, the measurements may be L1 measurements such as one or more of an RSRP, an RSRQ, a received signal strength indicator (RSSI), or a signal to noise and interference ratio (SINR) measurement of various signals, such as an SSB, a PSS, an SSS, a broadcast channel (BCH), a DM-RS, CSI-RS, or the like.

In some aspects, all cells in the L1/L2 mobility configured cell set may belong to the same DU and the cells may be on the same or different carrier frequencies. Cells in the L1/L2 mobility configured cell set may cover a mobility area.

Figure 5:
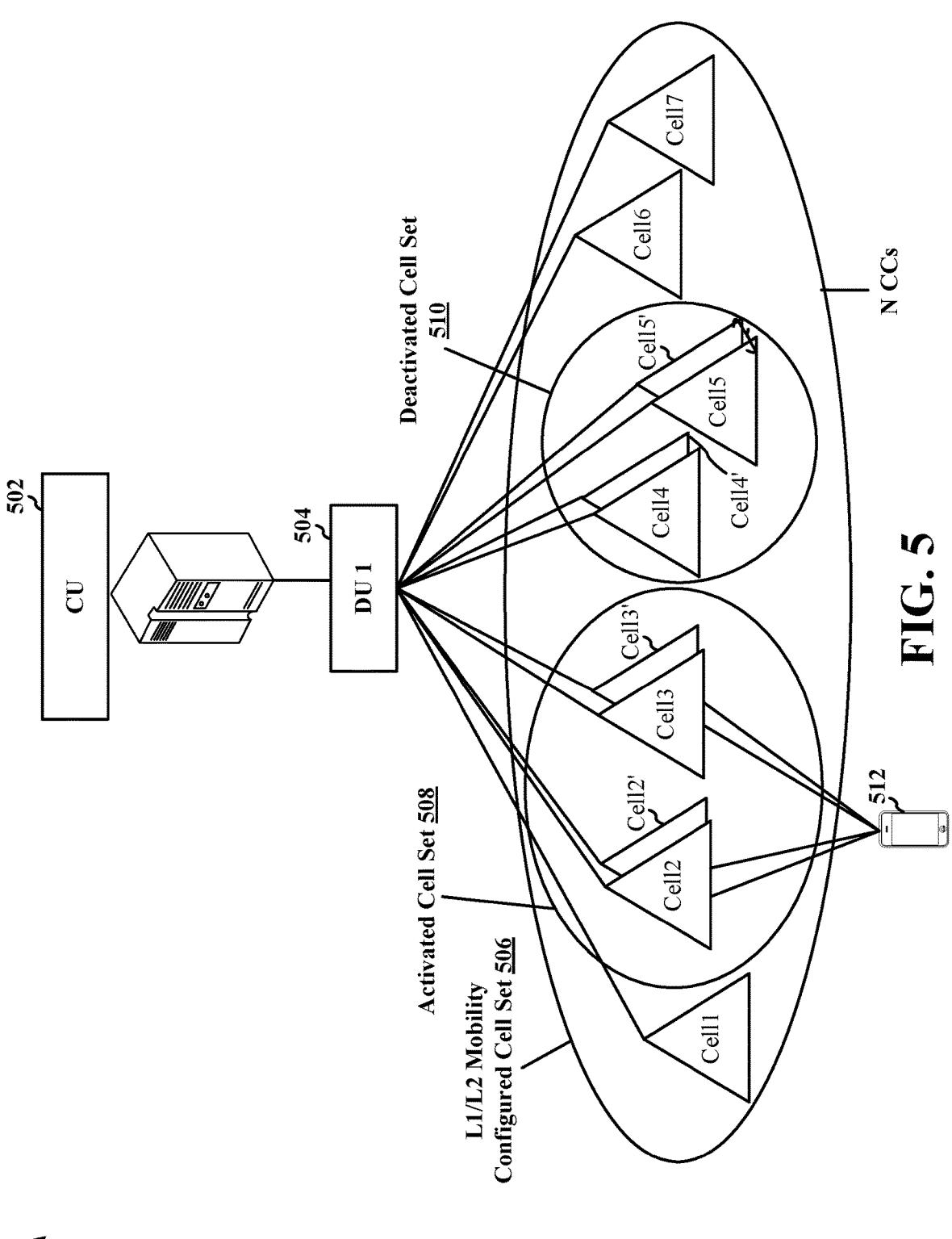
FIG. 5 is a diagram illustrating an example cell configuration.

FIG. 5 is a diagram 500 illustrating an example cell configuration. As illustrated in FIG. 5, a CU 502 (which may correspond to a component of a base station such as a gNB) may be associated with a first DU 504 (and other DUs). An L1/L2 mobility configured cell set 506 may be associated with the first DU 504 and may include an L1/L2 mobility activated cell set 508 and an L1/L2 mobility deactivated cell set 510. The L1/L2 mobility configured cell set 506 may also include one or more cells not in the current L1/L2 mobility activated cell set 508 or the current L1/L2 mobility deactivated cell set 510. For example, at a given time, the L1/L2 mobility activated cell set 508 may include a first subset of the L1/L2 mobility configured cell set, and the L1/L2 mobility deactivated cell set 510 may include a second, non-overlapping subset of the L1/L2 mobility configured cell set. There may remain one or more cells that are in the L1/L2 mobility configured cell set that are not in the first set subset (e.g., activated) or the second subset (e.g., deactivated). A UE 512 may use the cells in the L1/L2 mobility activated cell set 508 for data channel and control channel communications.

A UE may be provided with a subset of L1/L2 mobility deactivated cells (candidate cell set) that the UE may autonomously choose to add to the L1/L2 mobility activated cell set. For example, the UE may add cells in the subset of L1/L2 mobility deactivated cells to the L1/L2 mobility activated cell set based on measurements (e.g., measured channel quality), loading, or the like. In some aspects, each of the RUs could have multi-component carrier (CC) (N CCs) support (where each CC is a cell). In some aspects, activation or deactivation may be performed for groups of carriers (cells). For PCell management, L1/L2 signaling may be used to set the PCell out of the configured options within the activated cell set. In some aspects, L3 mobility may be used for PCell change (L3 handover) when a new PCell is not from the activated cell set for L1/L2 mobility. As an example, RRC signaling may be used to update the set of cells for L1/L2 mobility at L3 handover. Example aspects may enable L1/L2 based inter-cell mobility that may co-exist with CA. Example aspects may provide configuration, cell activation or deactivation, and associated with signaling to enable L1/L2 mobility with CA to facilitate more efficient and robust mobility management. In some aspects, L1/L2 mobility configured cells may be associated with a PCell configuration without being the PCell. The PCell configuration may be activated and one of the L1/L2 mobility activated cells (e.g., in an L1/L2 mobility activated cell set) may be activated based on L1/L2 signaling to become a PCell. In some aspects, L1/L2 mobility deactivated cells (e.g., in an L1/L2 mobility deactivated cell set) may support L1 measurements to facilitate sufficient beam management, timing synchronization, power control, or the like. For L1/L2 mobility deactivated cells, measurement reporting may be done on an activated cell.

A network node (e.g., a base station) may change a special cell (SpCell) for a UE using a layer 3 (L3) handover (e.g., using radio resource control (RRC) signaling). However, L3 handovers may be time-consuming and/or inefficient. Aspects presented herein provide a more rapid change for one or more cells, including SpCell and SCell, without a degradation in service quality. A network node that utilizes the improved L1/L2 signaling scheme is able to change one or more cells for a UE in a more rapid manner in comparison to L3 (RRC) based approaches. In an example, a UE receives an L1 or L2 mobility cell configuration for a set of cells for L1 or L2 inter-cell mobility. The set of cells may include multiple cells, and each cell in the set of cells is able to be activated or deactivated for data and/or control transfer using L1 or L2 signaling. The UE receives L1 or L2 signaling indicating multiple activated cells, and activates one or more cells in the multiple activated cells in a priority order for the data and/or control transfer using L1 or L2 signaling. Via the aforementioned L1 or L2 signaling, one or more cells, including SpCell and SCell, are able to be activated and/or deactivated in a manner that avoids RRC-based signaling. As a result, the cells may be activated and/or deactivated in a more rapid manner in comparison to RRC-based signaling. Additionally, the cells may be activated in a priority order to further facilitate more efficient and robust mobility management.

A base station may configure a UE, e.g., by transmitting a configuration to the UE in RRC signaling, with a set of cells for L1/L2 mobility. The set of cells may be referred to as an L1/L2 mobility configured set. A subset of the cells in the configured set may be activated and can be used for data and control transfer between the UE and the network. The subset of activated cells may be referred to as the L1/L2 mobility activated cell set. A subset of the L1/L2 mobility configured set may be deactivated and may be referred to as the L1/L2 mobility deactivated set. The L1/L2 deactivated set of cells can be activated for the UE by L1/L2 signaling from the network. Aspects presented herein provide for group level mobility management of the activated set, e.g., providing L1/L2 signaling that may be used to activate/deactivate cell groups within the L1/L2 mobility configured set of cells and/or to select beams within the activated cells. The group level mobility management may provide seamless mobility within the activated cell groups within the set.

Figure 6:
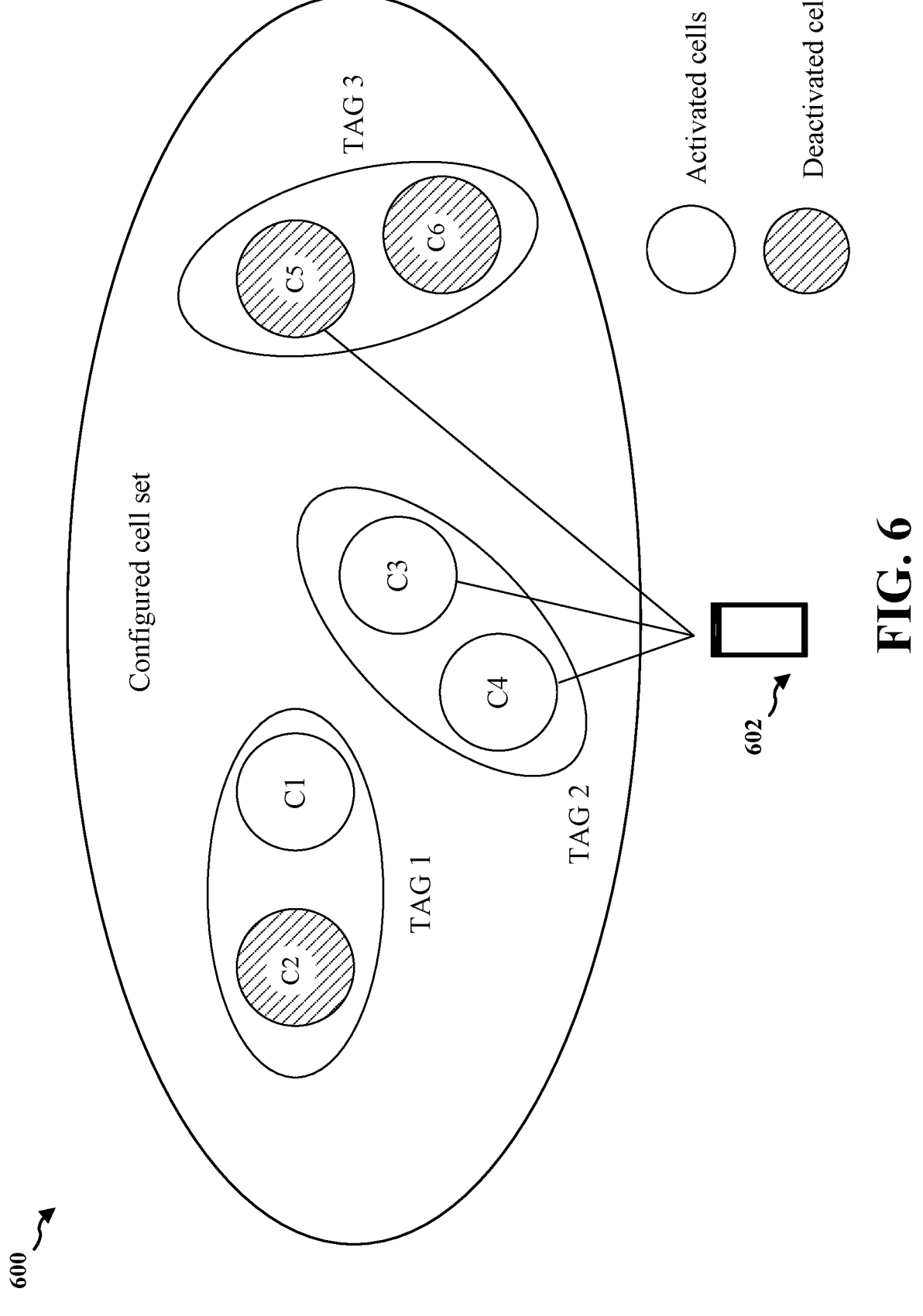
FIG. 6 is a diagram illustrating a system model of an example cell configuration.

FIG. 6 is a diagram 600 illustrating a system model of an example cell configuration. As shown in FIG. 6, a UE 602 may be configured with a set of cells (C1, . . . , C6) for L1/L2 mobility. The set of cells may be configured through radio resource control (RRC) signaling, e.g., transmitted by the network to the UE. Cells in the configured set (including PCell and SCells) may be further characterized into two groups: activated cells and deactivated cells, as shown in FIG. 6. The activated cells are service cells that are currently active and can be used for data and control transfer. The deactivated cells are service cells that are currently deactivated (and hence have no active data or control communication with the UE 602) but can be quickly activated through L1/L2 signaling to the UE from the network.

The UE 602 may be a mobile device and may be moving while communicating with the cells in the configured cell set. Mobility within the configured cell set may be done through L1/L2 signaling by fast activation/deactivation of cells in the configured cell set. That is, as the UE 602 moves, the PCell and/or SCells may change based on, for example, the UE's location and measurement reports using L1/L2 singling. A group of cells may be activated at one time.

In L1/L2 inter-cell mobility, aspects presented herein facilitate fast cell activation/deactivation using L1/L2 signaling. A group of cells may be activated at the same time. The activation process may include an update to both SpCell and SCell, an update to SCell only, or an update to SpCell only. Due to factors such as UE capability and network preference/requirement, aspects presented herein enable the order to activate the cells during the activation process.

This disclosure presents aspects for cell activation order for the case of activating multiple cells at one time during L1/L2 inter-cell mobility. The aspects presented herein include the call activation order options, signaling call flows, and RRC configuration considerations.

Figure 7:
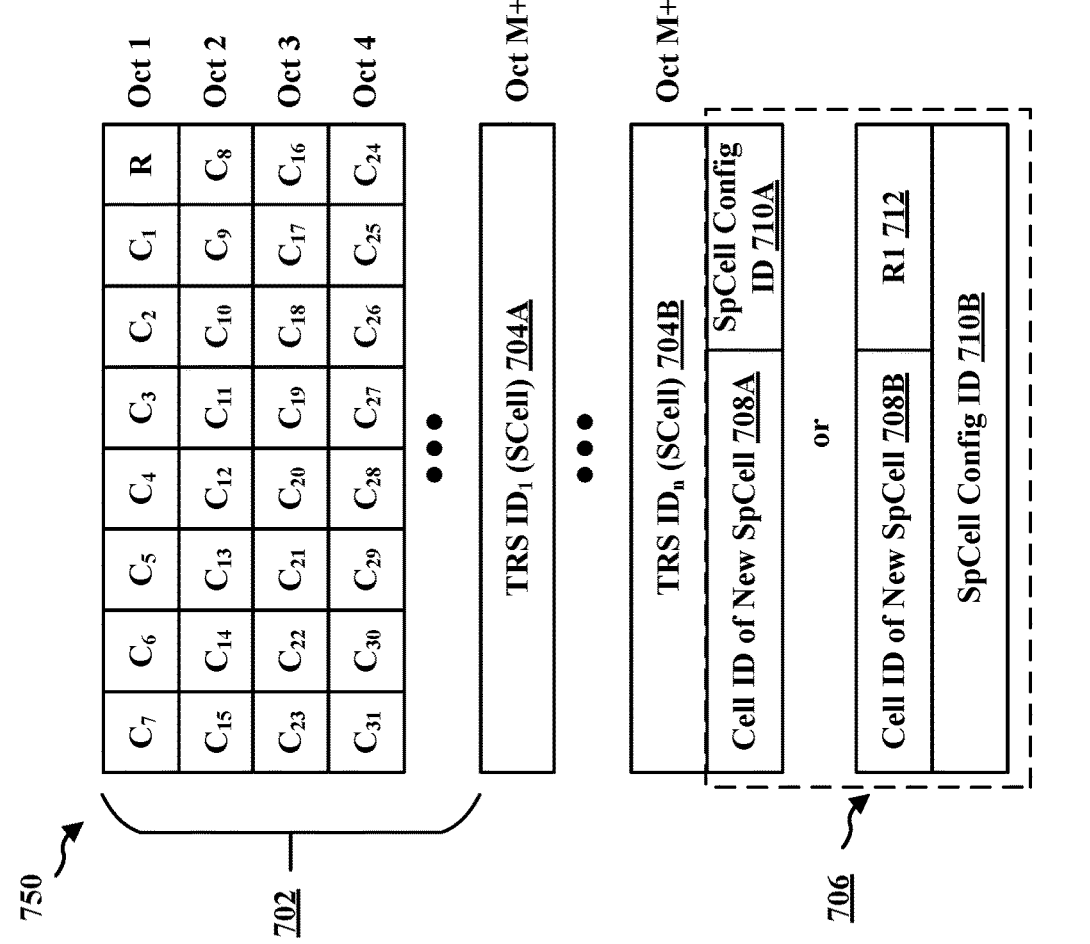
FIG. 7 is a diagram illustrating an example message for L1/L2 cell activation in accordance with various aspects of the present disclosure.

FIG. 7 is a diagram 700 illustrating an example message for layer 1 (L1)/layer 2 (L2) cell activation in accordance with various aspects of the present disclosure. The example message may be a medium access control-control element (MAC-CE) 750 for L1/L2 mobility. As shown in FIG. 7, the MAC-CE may include a C field 702. The C field 702 may be a field of binary bits, in which 0 refers to the deactivated cell index, and 1 refers to the activated cell index. As shown in FIG. 7, the C field may represent the multiple activated cells and deactivated cells at one time. Out of all the activated cells, one cell may be designated to be a new SpCell. For example, $C_1$ may refer to a first configured cell for L1/L2 inter-cell mobility, $C_2$ may refer to a second cell configured for L1/L2 inter-cell mobility, $C_3$ may refer to a third cell configured for L1/L2 inter-cell mobility, and so forth up to $C_{31}$, in the example in FIG. 7. The bit value (e.g., 0 or 1) for $C_1$, $C_2$, $C_3$, and $C_{31}$, may indicate whether the corresponding cell is activated or deactivated for L1/L2 inter-cell mobility. The C field may include multiple octets (i.e., multiple eight-bit groups), such as Oct 1, Oct 2, etc., as shown in FIG. 7. The number of octets designated to reference the cells configured for L1/L2 mobility may correspond to the maximum number of cells that can be configured for L1/L2 mobility, the overall number of configured cells, or the maximum number of cells that can be configured for a UE.

As shown in FIG. 7, for each of the currently activated cells (cell subset of size n) that were previously deactivated, there may be a tracking reference signal (TRS) ID (e.g., such as an 8-bit TRS ID 704A, 704B) pointing to an RRC configuration for an SCell activation reference signal configuration (which may be referred to as "SCellActivationRS-Config" or "SCellActivationRS-Config-r17" as an example). If there is an SpCell update, extra octet(s) 706 of information may be attached for the updated SpCell. The extra octet(s) 706 may include cell ID 708A, 708B of the new SpCell and the SpCell configuration ID 710A, 710B that points to a specific SpCell RRC configuration if multiple SpCell configurations are configured for the UE. In one configuration, the cell ID 708A of the new SpCell and the SpCell configuration ID 710A may occupy the same octet. Alternatively, the cell ID 708B of the new SpCell and the new SpCell configuration ID 710B may occupy separate octets, with zero or more reserved bits R1 712.

As described above, multiple cells may be activated through one cell activation MAC-CE. The activation of these cells may follow a specific order. In one configuration, the activated cells may first be characterized based on their categories (i.e., SpCell or SCell), and the SpCell may have the highest priority to be activated if there is SpCell update in the activation MAC-CE. There are several options for the activation order for activating multiple SCells. In one configuration, multiple SCells may be activated based on their SCell indices. For example, for three SCells with cell indices of 1, 2, 3, respectively, these SCells may be activated in an order based on their cell indices (e.g., the SCell with the cell index 1 will be activated first, followed by the SCell with the cell index 2, and followed by the SCell with the cell index 3). In one configuration, multiple SCells may be activated based on preconfigured priority configuration. RRC may configure the priority level for each SCell. The priority level may be indicated together with cell activation MAC-CE or as separate signaling. In some aspects, multiple priority levels may be configured for each SCell, and RRC may further indicate which one priority level of the multiple priority levels may be used at a specific time for activating the SCells. In one configuration, to reduce signaling overhead, multiple SCells may be activated based on preconfigured priority group for each SCell. RRC may configure each SCell with a priority group ID. When multiple SCells are activated, the UE may follow the SCell's priority group ID to activate the SCells. The SCells with a higher priority group ID may be activated prior to the SCells with a lower priority group ID, and the SCells with the same group ID may be activated indifferently.

Figure 8:
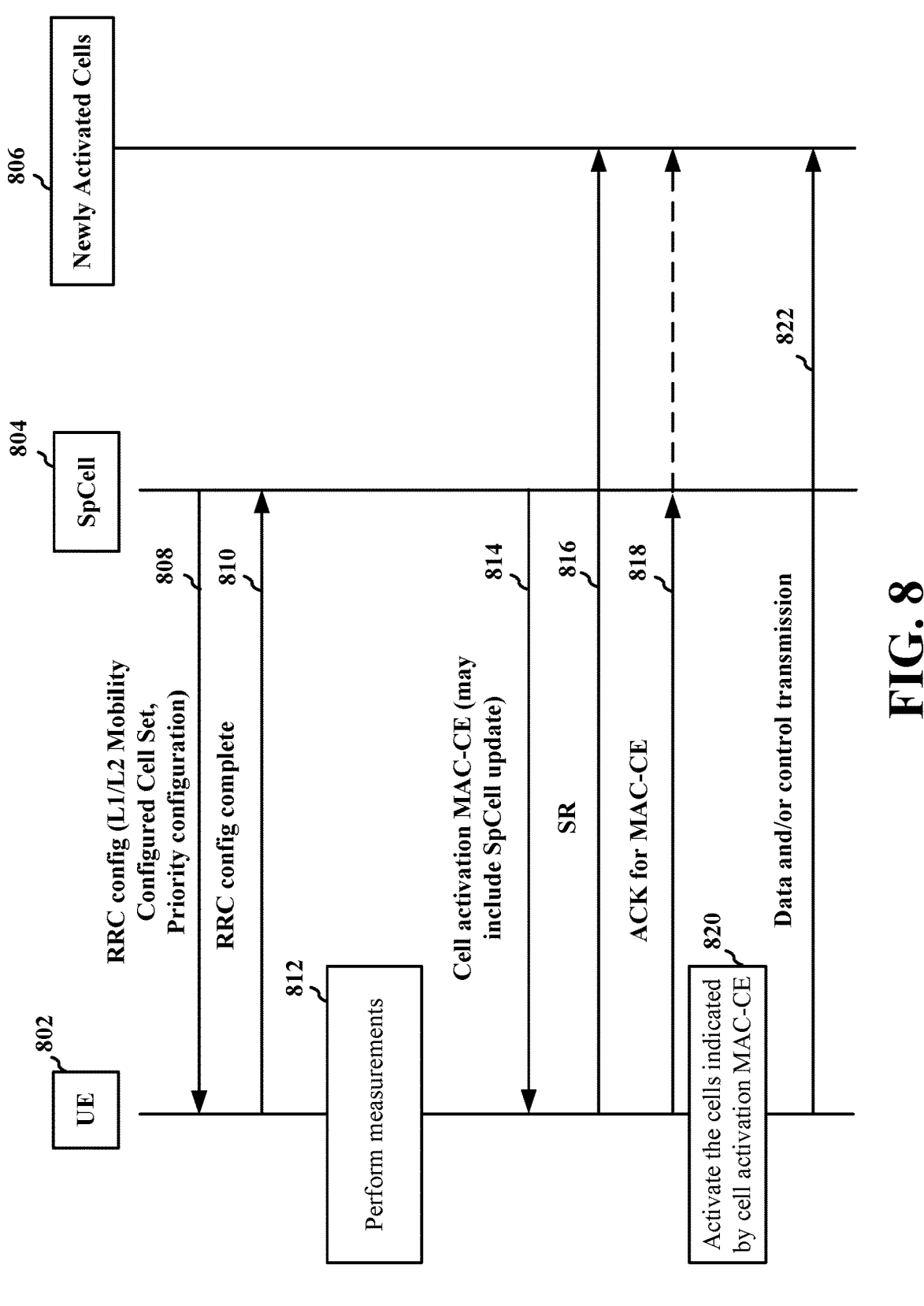
FIG. 8 is a call flow of a method of wireless communication in accordance with various aspects of the present disclosure.

FIG. 8 is a call flow 800 of a method of wireless communication in accordance with various aspects of the present disclosure. The call flow 800 illustrates joint timing advance (TA) and cell activation scheme. As shown in FIG. 8, an SpCell 804 may send an RRC configuration to a UE 802. The RRC configuration may include L1/L2 mobility configured cell set, and may also include priority configuration associated with the L1/L2 mobility configured cell set. The UE 802 may, at 810, send to the SpCell 804 a confirmation confirming the RRC configuration is complete. At 812, the UE 802 may perform measurements on all the cells the UE 802 is connected to. At 814, the SpCell 804 may send a cell activation MAC-CE to the UE 802. The cell activation MAC-CE may include the activated set of one or more SCells, and may also include an SpCell update. Upon receiving the cell activation MAC-CE, the UE 802 may send the confirmation message to the joint MAC-CE regarding new cell activation and TA confirmation. The confirmation may be implicit or explicit. To implicitly confirm the new cell activation, the UE 802 may, at 816, send a scheduling request (SR) to the newly activated cells 806 using the TA signaled in step 814 to indicate successful new cell activation. To explicitly confirm the new cell activation, the UE 802 may, at 818, directly send acknowledgment (ACK) for joint TA/cell activation MAC-CE received at 814 to the SpCell 804 or the newly activated cells 806. The reception of the ACK may indicate successful new cell activation. After the confirmation phrase (816 or 818), the UE 802 may, at 820, activate the cells based on one of the activation orders described above. At 822, the UE 802 may perform data and/or control transmission with the newly activated cells 806.

The RRC configuration described above may include an L1/L2 mobility configured cell set, resources for receiving the cell activation MAC-CE, and priority configurations. The priority configurations may include multiple priority options, e.g., including two or more of the different options for activation orders presented herein. Depending on the specific priority option used, the priority configuration may also include a priority index or the priority group ID configuration for each of the cells to be activated. Multiple values of the above parameters may be configured, and the network or base station may use control signaling, such as a MAC-CE or DCI, to switch among the multiple types of activation order configurations that were previously configured for the UE, e.g., to switch among the values of the parameters to be used for the configuration.

FIG. 9 is a flowchart 900 of a method of wireless communication at a UE in accordance with various aspects of the present disclosure. The method may be performed by a UE. The UE may be the UE 104, 350, 402, 452, 512, 802, or the apparatus 1304 in the hardware implementation of FIG. 13. The method provides configuration, cell activation or deactivation in an optimized order, and associated signaling to enable L1/L2 mobility for more efficient and robust mobility management.

As shown in FIG. 9, at 902, the UE may receive, from a network entity, a layer 1 (L1) or layer 2 (L2) mobility cell configuration for a set of cells for L1 or L2 inter-cell mobility. The set of cells may include multiple cells, and each cell in the set of cells may be able to be activated or deactivated for data and/or control transfer using L1 or L2 signaling. The network entity may be a base station, or a component of a base station, in the access network of FIG. 1 or a core network component (e.g., base station 102, 310; CU 502; DU 504; SpCell 804; or the network entity 1302 in the hardware implementation of FIG. 13). FIGS. 7 and 8 illustrate various aspects of the steps in connection with the flowchart 900. For example, referring to FIG. 8, the UE 802 may receive, at 808, an L1 or L2 mobility cell configuration for a set of cells for L1 or L2 inter-cell mobility from a network entity (SpCell 804). The set of cells may include multiple cells, and each cell in the set of cells may be able to be activated or deactivated for data and/or control transfer using L1 or L2 signaling.

At 904, the UE may receive L1 or L2 signaling indicating multiple activated cells from the network entity. For example, referring to FIG. 8, the UE 802 may, at 814, receive L1 or L2 signaling indicating multiple activated cells from the network entity (SpCell 804). The UE 802 may receive the L1 or L2 signaling through, for example, a cell activation MAC-CE. Referring to FIG. 7, the cell activation MAC-CE 750 may indicate multiple activated cells (via the C field 702).

At 906, the UE may activate one or more cells in the multiple activated cells in a priority order for the data and/or control transfer using L1 or L2 signaling. For example, referring to FIG. 8, the UE 802 may, at 820, activate one or more cells in the multiple activated cells in a priority order for the data and/or control transfer using L1 or L2 signaling.

Figure 10:
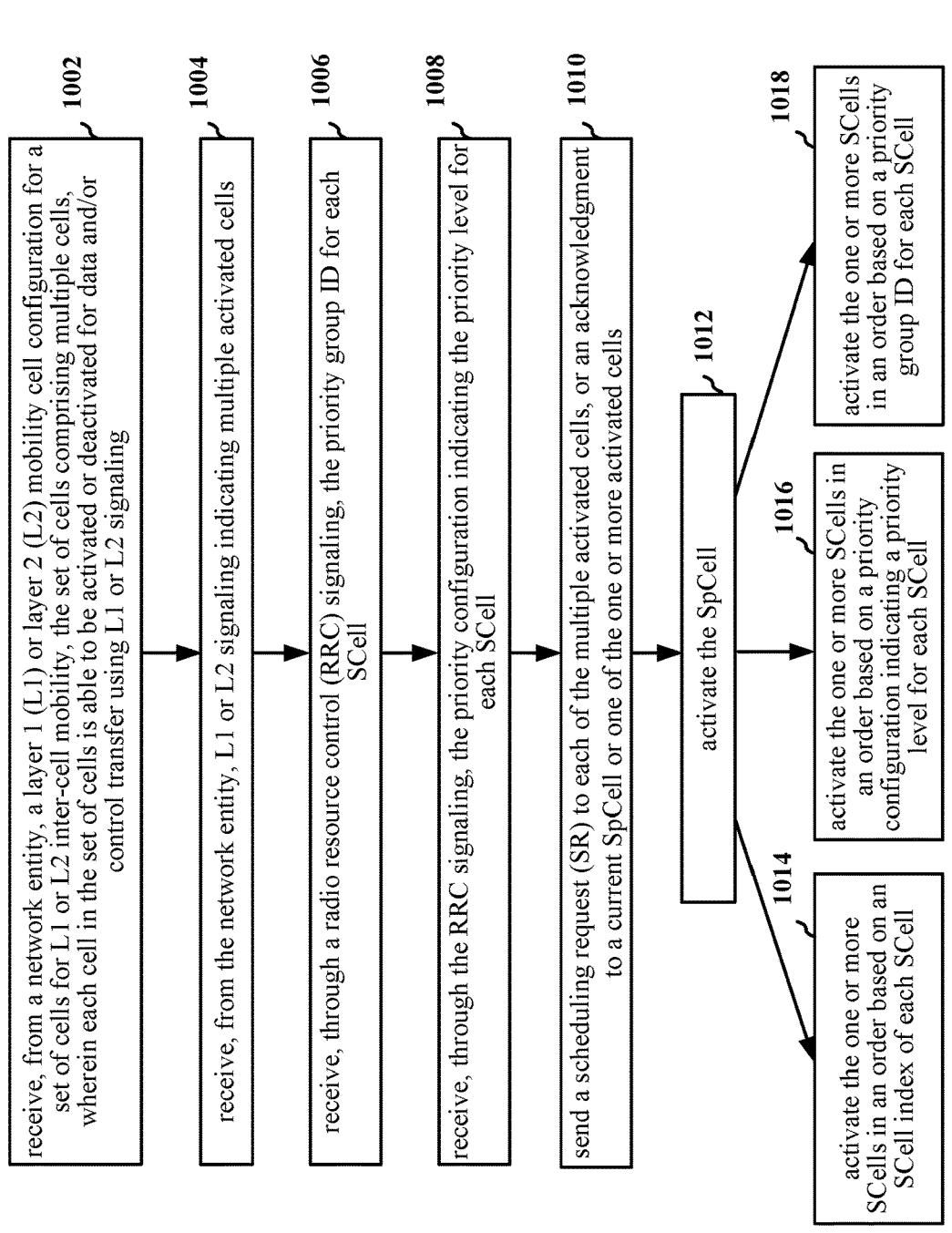
FIG. 10 is a second flowchart of a method of wireless communication at a UE in accordance with various aspects of the present disclosure.

FIG. 10 is a flowchart 1000 of a method of wireless communication at a UE in accordance with various aspects of the present disclosure. The method may be performed by a UE. The UE may be the UE 104, 350, 402, 452, 512, 802, or the apparatus 1304 in the hardware implementation of FIG. 13. The method provides configuration, cell activation or deactivation in an optimized order, and associated signaling to enable L1/L2 mobility for more efficient and robust mobility management.

As shown in FIG. 10, at 1002, the UE may receive, from a network entity, an L1 or L2 mobility cell configuration for a set of cells for L1 or L2 inter-cell mobility. The set of cells may include multiple cells, and each cell in the set of cells may be able to be activated or deactivated for data and/or control transfer using L1 or L2 signaling. The network entity may be a base station, or a component of a base station, in the access network of FIG. 1 or a core network component (e.g., base station 102, 310; CU 502; DU 504; SpCell 804; or the network entity 1302 in the hardware implementation of FIG. 13). FIGS. 7 and 8 illustrate various aspects of the steps in connection with the flowchart 1000. For example, referring to FIG. 8, the UE 802 may receive, at 808, an L1 or L2 mobility cell configuration for a set of cells for L1 or L2 inter-cell mobility from a network entity (SpCell 804). The set of cells may include multiple cells, and each cell in the set of cells may be able to be activated or deactivated for data and/or control transfer using L1 or L2 signaling.

At 1004, the UE may receive L1 or L2 signaling indicating multiple activated cells from the network entity. For example, referring to FIG. 8, the UE 802 may, at 814, receive L1 or L2 signaling indicating multiple activated cells from the network entity (SpCell 804). The UE 802 may receive the L1 or L2 signaling through a cell activation MAC-CE. Referring to FIG. 7, the cell activation MAC-CE may indicate multiple activated cells (via the C field 702). After the UE receives the L1 or L2 signaling indicating multiple activated cells, the UE may activate one or more cells in the multiple activated cells in a priority order. The activation of the one or more cells in the multiple activated cells in the priority order may be performed in various ways.

In some aspects, the multiple activated cells may include at least one of an SpCell or at least one SCell. The activation of the one or more cells in the multiple activated cells in the priority order may be performed by activating the SpCell before activating the at least one SCell. That is, at 1012, the UE may activate the SpCell. The at least one SCell may be activated after the SpCell has been activated. For example, referring to FIGS. 7 and 8, the multiple activated cells the UE 802 received at 814 through the cell activation MAC-CE 750 may include an SpCell and at least one SCell. In that case, the UE 802 may activate, at 820, the SpCell before activating the at least one SCell.

In some aspects, the L1 or L2 signaling may further indicate at least one of a bitmap indicating the multiple activated cells and one or more deactivated cells from the set of cells, a TRS ID for each of the one or more cells in the multiple activated cells, a cell ID for the SpCell, or an SpCell configuration ID for SpCell configuration. For example, referring to FIG. 7, the L1 or L2 signaling (cell activation MAC-CE 750) may indicate at least one of a bitmap (C field 702) indicating the multiple activated cells and one or more deactivated cells from the set of cells (e.g., $C_1, \ldots, C_{31}$), a TRS ID 704A, 704B for each of the one or more cells in the multiple activated cells, a cell ID 708A, 708B for the SpCell, or an SpCell configuration ID 710A, 710B for SpCell configuration.

In some aspects, the UE may receive the L1 or L2 signaling in a MAC-CE or downlink control information (DCI). For example, referring to FIG. 7 and FIG. 8, the L1 or L2 signaling may be received by the UE 802, at 814, in a MAC-CE 750.

In some aspects, the L1 or L2 signaling may be included in a message that includes a number of octets corresponding to a first maximum number of cells configured for the data and/or control transfer using L1 or L2 signaling, an overall number of cells configured for the data and/or control transfer using L1 or L2 signaling, or a second maximum number of cells that can be configured for the data and/or control transfer using L1 or L2 signaling for the UE. For example, referring to FIG. 7, the L1 or L2 signaling may be included in a message (cell activation MAC-CE 750). The cell activation MAC-CE 750 may include a number of octets Oct 1, Oct 2, . . . . The octets Oct 1, Oct 2, . . . may correspond to the first maximum number of cells configured for the data and/or control transfer using L1 or L2 signaling, the overall number of cells configured for the data and/or control transfer using L1 or L2 signaling, or the second maximum number of cells that can be configured for the data and/or control transfer using L1 or L2 signaling for the UE 802.

In some aspects, the multiple activated cells may include one or more SCells. The activation of the one or more SCells in the multiple activated cells may be performed in various ways.

In one configuration, at 1014, the UE may activate the one or more SCells in an order based on an SCell index of each SCell. For example, referring to FIG. 8, when the UE 802 activates, at 820, the one or more cells in the multiple activated cells, the UE 802 may activate the one or more SCells in an order based on an SCell index of each SCell.

In one configuration, at 1016, the UE may activate the one or more SCells in an order based on a priority configuration indicating a priority level for each SCell. For example, referring to FIG. 8, when the UE 802 activates, at 820, the one or more cells in the multiple activated cells, the UE 802 may activate the one or more SCells in an order based on a priority configuration indicating a priority level for each SCell.

At 1008, the UE may receive, through the RRC signaling, the priority configuration indicating the priority level for each SCell. For example, referring to FIG. 8, the UE 802 may receive, at 808, through the RRC signaling, the priority configuration indicating the priority level for each SCell.

In some aspects, the priority configuration may include multiple priority levels for each SCell, and the L1 or L2 singling may include an indication of one priority level of the multiple priority levels. When activating the one or more cells in the multiple activated cells in the priority order, the one or more SCells may be activated in an order based on the one priority level of the multiple priority levels for each SCell. For example, referring to FIG. 8, when the UE 802 receives, at 808, through the RRC signaling, the priority configuration indicating the priority level for each SCell, the priority configuration may include multiple priority levels for each SCell. The L1 or L2 signaling, at 808, may include an indication of one priority level of the multiple priority levels. When the UE 802 activates, at 820, the one or more cells in the multiple activated cells, the UE 802 may activate the one or more SCells in an order based on the one priority level of the multiple priority levels for each SCell.

In some aspects, the priority configuration may include multiple priority levels for each SCell. When activating the one or more cells in the multiple activated cells in the priority order, the one or more SCells may be activated in an order based on one priority level of the multiple priority levels for each SCell. The one priority level of the multiple priority levels for each SCells may be indicated as a separate signal. For example, referring to FIG. 8, when the UE 802 receives, at 808, through the RRC signaling, the priority configuration indicating the priority level for each SCell, the priority configuration may include multiple priority levels for each SCell. When the UE 802 activates, at 820, the one or more cells in the multiple activated cells, the one or more SCells may be activated in an order based on one priority level of the multiple priority levels for each SCell, and the one priority level of the multiple priority levels may be indicated as a separate signal to the UE 802.

In one configuration, at 1018, the UE may activate the one or more SCells in an order based on a priority group ID for each SCell. For example, referring to FIG. 8, when the UE 802 activates, at 820, the one or more cells in the multiple activated cells, the UE 802 may activate the one or more SCells in an order based on a priority group ID for each SCell.

At 1006, the UE may receive, through the RRC signaling, the priority group ID for each SCell. For example, referring to FIG. 8, the UE 802 may receive from the SpCell 804, through the RRC signaling, the priority group ID for each SCell.

At 1010, the UE may send a scheduling request (SR) to each of the multiple activated cells, or send an acknowledgment to a current SpCell or one of the one or more activated cells. For example, referring to FIG. 8, the UE 802 may, at 816, send an SR to each of the multiple activated cells (newly activated cells 806). Alternatively, the UE 802 may send, at 818, an acknowledgment to a current SpCell 804 or one of the one or more activated cells (newly activated cells 806).

FIG. 11 is a flowchart 1100 of a method of wireless communication at a network entity in accordance with various aspects of the present disclosure. The method may be performed by a network entity. The network entity may be a base station, or a component of a base station, in the access network of FIG. 1 or a core network component (e.g., base station 102, 310; CU 502; DU 504; SpCell 804; or the network entity 1302 in the hardware implementation of FIG. 13). The method provides configuration, cell activation or deactivation in an optimized order, and associated signaling to enable L1/L2 mobility for more efficient and robust mobility management.

As shown in FIG. 11, at 1102, the network entity may transmit, to a UE, an L1 or L2 mobility cell configuration for a set of cells for L1 or L2 inter-cell mobility. The set of cells may include multiple cells, and each cell in the set of cells may be able to be activated or deactivated for data and/or control transfer using L1 or L2 signaling. The UE may be the UE 104, 350, 402, 452, 512, 802, or the apparatus 1304 in the hardware implementation of FIG. 13. FIGS. 7 and 8 illustrate various aspects of the steps in connection with the flowchart 1100. For example, referring to FIG. 8, the network entity (SpCell 804) may transmit, at 808, an L1 or L2 mobility cell configuration for a set of cells for L1 or L2 inter-cell mobility to a UE 802. The set of cells may include multiple cells, and each cell in the set of cells may be able to be activated or deactivated for data and/or control transfer using L1 or L2 signaling.

At 1104, the network entity may transmit, to the UE, L1 or L2 signaling indicating multiple activated cells. The UE may be configured to activate one or more cells in the multiple activated cells in a priority order for the data and/or control transfer using L1 or L2 signaling. For example, referring to FIG. 8, the network entity (SpCell 804) may, at 814, transmit L1 or L2 signaling indicating multiple activated cells to the UE 802. The network entity (SpCell 804) may transmit the L1 or L2 signaling to the UE 802 through, for example, a cell activation MAC-CE. Referring to FIG. 7, the cell activation MAC-CE 750 may indicate multiple activated cells (via the C field 702). The UE 802 may be configured to activate, at 820, one or more cells in the multiple activated cells in a priority order for the data and/or control transfer using L1 or L2 signaling.

FIG. 12 is a flowchart 1200 of a method of wireless communication at a network entity in accordance with various aspects of the present disclosure. The method may be performed by a network entity. The network entity may be a base station, or a component of a base station, in the access network of FIG. 1 or a core network component (e.g., base station 102, 310; CU 502; DU 504; SpCell 804; or the network entity 1302 in the hardware implementation of FIG. 13). The method provides configuration, cell activation or deactivation in an optimized order, and associated signaling to enable L1/L2 mobility for more efficient and robust mobility management.

As shown in FIG. 12, at 1202, the network entity may transmit, to a UE, an L1 or L2 mobility cell configuration for a set of cells for L1 or L2 inter-cell mobility. The set of cells may include multiple cells, and each cell in the set of cells may be able to be activated or deactivated for data and/or control transfer using L1 or L2 signaling. The UE may be the UE 104, 350, 402, 452, 512, 802, or the apparatus 1304 in the hardware implementation of FIG. 13. FIGS. 7 and 8 illustrate various aspects of the steps in connection with the flowchart 1200. For example, referring to FIG. 8, the network entity (SpCell 804) may transmit, at 808, an L1 or L2 mobility cell configuration for a set of cells for L1 or L2 inter-cell mobility to a UE 802. The set of cells may include multiple cells, and each cell in the set of cells may be able to be activated or deactivated for data and/or control transfer using L1 or L2 signaling.

At 1204, the network entity may transmit, to the UE, L1 or L2 signaling indicating multiple activated cells. The UE may be configured to activate one or more cells in the multiple activated cells in the priority order for the data and/or control transfer using L1 or L2 signaling. For example, referring to FIG. 8, the network entity (SpCell 804) may, at 814, transmit L1 or L2 signaling indicating multiple activated cells to the UE 802. The network entity (SpCell 804) may transmit the L1 or L2 signaling to the UE 802 through, for example, a cell activation MAC-CE. Referring to FIG. 7, the cell activation MAC-CE 750 may indicate multiple activated cells (via the C field 702). The UE 802 may be configured to activate, at 820, one or more cells in the multiple activated cells in a priority order for the data and/or control transfer using L1 or L2 signaling. The activation of the one or more cells in the multiple activated cells in the priority order may be performed in various ways.

In some aspects, the multiple activated cells may include at least one of an SpCell or at least one SCell. To activate one or more cells in the multiple activated cells in a priority order, the UE may be configured to activate the SpCell before activating the at least one SCell. For example, referring to FIGS. 7 and 8, the multiple activated cells the UE 802 received at 814 through the cell activation MAC-CE 750 may include an SpCell and at least one SCell. In that case, the UE 802 may activate, at 820, the SpCell before activating the at least one SCell.

In some aspects, the L1 or L2 signaling may further indicate at least one of a bitmap indicating the multiple activated cells and one or more deactivated cells from the set of cells, a TRS ID for each of the one or more cells in the multiple activated cells, a cell ID for the SpCell, or an SpCell configuration ID for SpCell configuration. For example, referring to FIG. 7, the L1 or L2 signaling (cell activation MAC-CE 750) may indicate at least one of a bitmap (C field 702) indicating the multiple activated cells and one or more deactivated cells from the set of cells (e.g., $C_1, \ldots, C_{31}$), a TRS ID 704A, 704B for each of the one or more cells in the multiple activated cells, a cell ID 708A, 708B for the SpCell, or an SpCell configuration ID 710A, 710B for SpCell configuration.

In some aspects, the L1 or L2 signaling may be received in a MAC-CE or downlink control information (DCI). For example, referring to FIG. 7 and FIG. 8, the L1 or L2 signaling may be transmitted by the network entity (SpCell 804), at 814, in a MAC-CE 750.

In some aspects, the L1 or L2 signaling may be included in a message that includes a number of octets corresponding to a first maximum number of cells configured for the data and/or control transfer using L1 or L2 signaling, an overall number of cells configured for the data and/or control transfer using L1 or L2 signaling, or a second maximum number of cells that can be configured for the data and/or control transfer using L1 or L2 signaling for the UE. For example, referring to FIG. 7, the L1 or L2 signaling may be included in a message (cell activation MAC-CE 750). The cell activation MAC-CE 750 may include a number of octets Oct 1, Oct 2, . . . . The octets Oct 1, Oct 2, . . . may correspond to the first maximum number of cells configured for the data and/or control transfer using L1 or L2 signaling, the overall number of cells configured for the data and/or control transfer using L1 or L2 signaling, or the second maximum number of cells that can be configured for the data and/or control transfer using L1 or L2 signaling for the UE 802.

In some aspects, the multiple activated cells may include one or more SCells. The activation of the one or more SCells in the multiple activated cells may be performed in various ways.

In one configuration, to activate one or more cells in the multiple activated cells in a priority order, the UE may be configured to activate the one or more SCells in an order based on an SCell index of each SCell. For example, referring to FIG. 8, when the UE 802 activates, at 820, the one or more cells in the multiple activated cells, the UE 802 may activate the one or more SCells in an order based on an SCell index of each SCell.

In one configuration, to activate one or more cells in the multiple activated cells in a priority order, the UE may be configured to activate the one or more SCells in an order based on a priority configuration indicating a priority level for each SCell. For example, referring to FIG. 8, when the UE 802 activates, at 820, the one or more cells in the multiple activated cells, the UE 802 may activate the one or more SCells in an order based on a priority configuration indicating a priority level for each SCell.

In one configuration, at 1206, the network entity may transmit, to the UE, through a radio resource control (RRC) signaling, the priority configuration indicating the priority level for each SCell. For example, referring to FIG. 8, the network entity (SpCell 804) may transmit, at 808, through the RRC signaling, the priority configuration indicating the priority level for each SCell to the UE 802.

In some aspects, the priority configuration may include multiple priority levels for each SCell, and the L1 or L2 singling may include an indication of one priority level of the multiple priority levels. To activate one or more cells in the multiple activated cells in a priority order, the UE may be configured to activate the one or more SCells in an order based on the one priority level of the multiple priority levels for each SCell. For example, referring to FIG. 8, when the UE 802 receives, at 808, through the RRC signaling, the priority configuration indicating the priority level for each SCell, the priority configuration may include multiple priority levels for each SCell. The L1 or L2 signaling, at 808, may include an indication of one priority level of the multiple priority levels. When the UE 802 activates, at 820, the one or more cells in the multiple activated cells, the UE 802 may activate the one or more SCells in an order based on the one priority level of the multiple priority levels for each SCell.

In some aspects, the priority configuration may include multiple priority levels for each SCell. To activate one or more cells in the multiple activated cells in a priority order, the UE may be configured to activate the one or more SCells in an order based on one priority level of the multiple priority levels for each SCell. The one priority level of the multiple priority levels for each SCells may be indicated as a separate signal. For example, referring to FIG. 8, when the UE 802 receives, at 808, through the RRC signaling, the priority configuration indicating the priority level for each SCell, the priority configuration may include multiple priority levels for each SCell. When the UE 802 activates, at 820, the one or more cells in the multiple activated cells, the one or more SCells may be activated in an order based on one priority level of the multiple priority levels for each SCell, and the one priority level of the multiple priority levels may be indicated as a separate signal to the UE 802.

In one configuration, to activate one or more cells in the multiple activated cells in a priority order, the UE may be configured to activate the one or more SCells in an order based on a priority group ID for each SCell. For example, referring to FIG. 8, when the UE 802 activates, at 820, the one or more cells in the multiple activated cells, the UE 802 may activate the one or more SCells in an order based on a priority group ID for each SCell.

In one configuration, at 1208, the network entity may transmit, through the RRC signaling, the priority group ID for each SCell to the UE. For example, referring to FIG. 8, the network entity (SpCell 804) may transmit to the UE 802, through the RRC signaling, the priority group ID for each SCell.

In one configuration, at 1210, the network entity may receive, from the UE, after transmitting the L1 or L2 signaling, an acknowledgment indicating a successful new cell activation. The acknowledgment may be sent to one of the one or more activated cells. The UE may also be configured to may send an SR to each of the multiple activated cells. For example, referring to FIG. 8, the UE 802 may, at 816, send an SR to each of the multiple activated cells (newly activated cells 806). Alternatively, the UE 802 may send, at 818, an acknowledgment to a current SpCell 804 or one of the one or more activated cells (newly activated cells 806).

Figure 13:
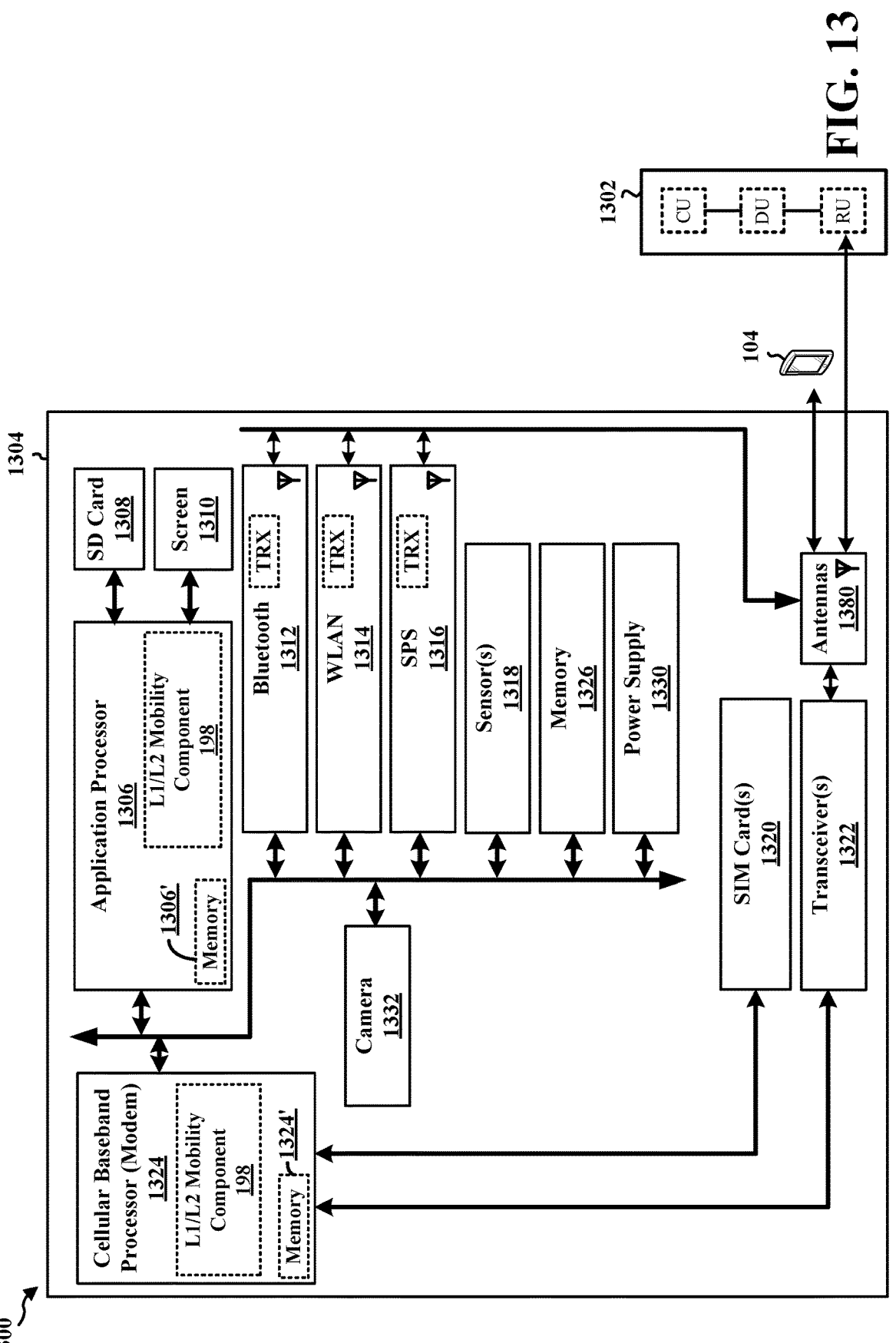
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory.

The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The cellular baseband processor(s) 1324 and the application processor(s) 1306 are configured to perform the various functions described supra based at least in part of the information stored in the memory. That is, the cellular baseband processor(s) 1324 and the application processor(s) 1306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see 350 of FIG. 3) and include the additional modules of the apparatus 1304.

As discussed supra, the component 198 is configured to receive, from a network entity, an L1 or L2 mobility cell configuration for a set of cells for L1 or L2 inter-cell mobility. The set of cells comprising multiple cells, and each cell in the set of cells is able to be activated or deactivated for data and/or control transfer using L1 or L2 signaling. The component 198 may be further configured to receive, from the network entity, L1 or L2 signaling indicating multiple activated cells; and activate one or more cells in the multiple activated cells in a priority order for the data and/or control transfer using L1 or L2 signaling. The component 198 may be further configured to perform any of the aspects described in connection with the flowcharts in FIG. 9 or FIG. 10, and/or the aspects performed by the UE in the communication flow in FIG. 8. The component 198 may be within the cellular baseband processor(s) 1324, the application processor(s) 1306, or both the cellular baseband processor(s) 1324 and the application processor(s) 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, includes means for receiving, from a network entity, an L1 or L2 mobility cell configuration for a set of cells for L1 or L2 inter-cell mobility. The set of cells comprising multiple cells, and each cell in the set of cells is able to be activated or deactivated for data and/or control transfer using L1 or L2 signaling. The apparatus 1304 may further includes means for receiving, from the network entity, L1 or L2 signaling indicating multiple activated cells; and means for activating one or more cells in the multiple activated cells in a priority order for the data and/or control transfer using L1 or L2 signaling. The apparatus 1304 may further include means for performing any of the aspects described in connection with the flowcharts in FIGS. 9 and 10, and/or the aspects performed by the UE in FIG. 8. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
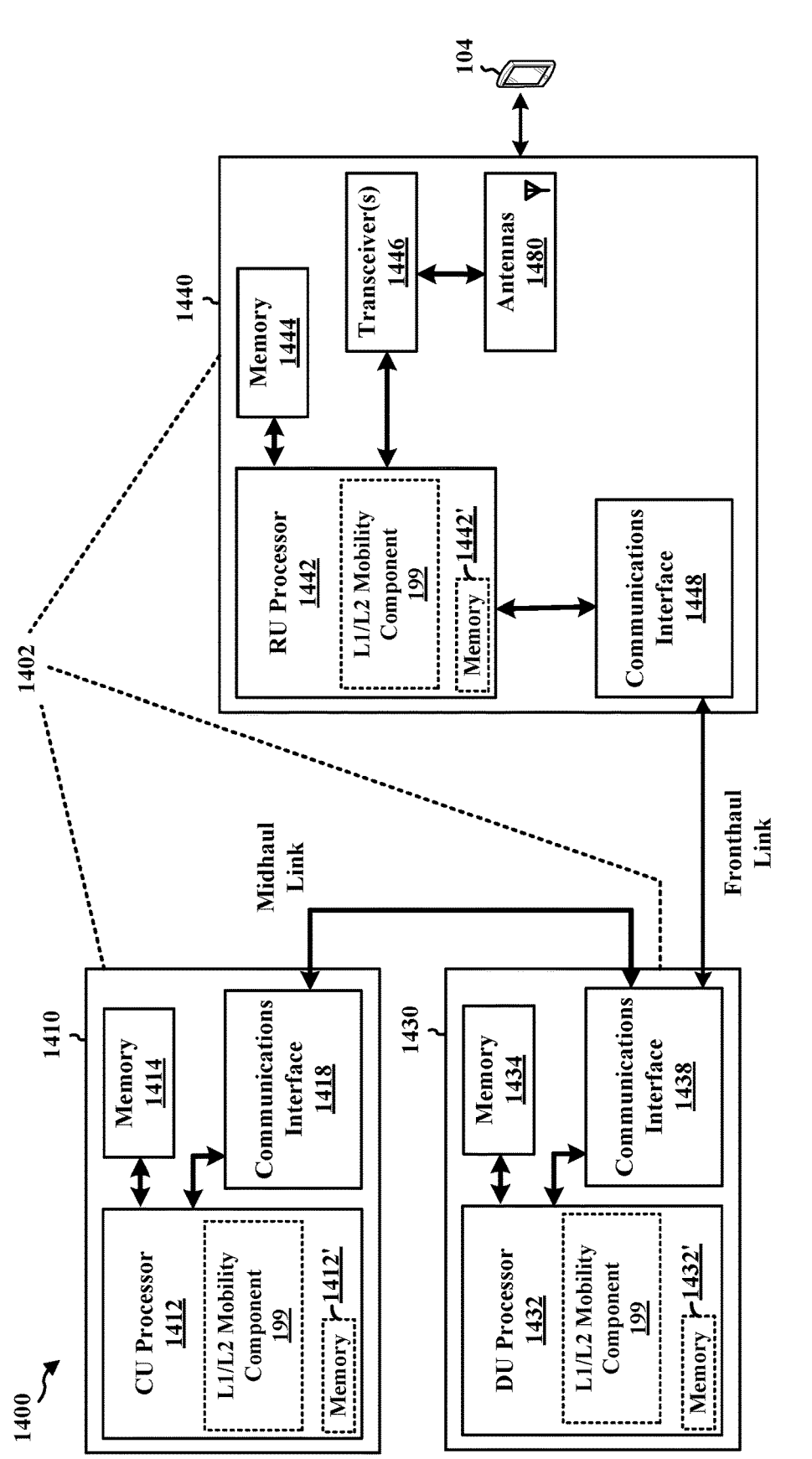
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor 1412. The CU processor(s) 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor 1432. The DU processor(s) 1432 may include on-chip memory 1432'. In some aspects, the DU 1430 may further include additional memory modules 1434 and a communications interface 1438. The DU 1430 communicates with the RU 1440 through a fronthaul link. The RU 1440 may include at least one RU processor 1442. The RU processor(s) 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit, to a UE, an L1 or L2 mobility cell configuration for a set of cells for L1 or L2 inter-cell mobility. The set of cells may include multiple cells, and each cell in the set of cells may be able to be activated or deactivated for data and/or control transfer using L1 or L2 signaling. The component 199 may be further configured to transmit, to the UE, L1 or L2 signaling indicating multiple activated cell. The UE is configured to activate one or more cells in the multiple activated cells in a priority order for the data and/or control transfer using L1 or L2 signaling. The component 199 may be further configured to perform any of the aspects described in connection with the flowcharts in FIG. 11 or FIG. 12, and/or the aspects performed by the network in the communication flow in FIG. 8. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 includes means for transmitting, to a UE, an L1 or L2 mobility cell configuration for a set of cells for L1 or L2 inter-cell mobility. The set of cells may include multiple cells, and each cell in the set of cells may be able to be activated or deactivated for data and/or control transfer using L1 or L2 signaling. The network entity 1402 may further include means for transmitting, to the UE, L1 or L2 signaling indicating multiple activated cells. The UE may be configured to activate one or more cells in the multiple activated cells in a priority order for the data and/or control transfer using L1 or L2 signaling. The network entity 1402 may further include means for performing any of the aspects described in connection with the flowcharts in FIGS. 11 and 12, and/or the aspects performed by the SpCell in FIG. 8. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Figure 15:
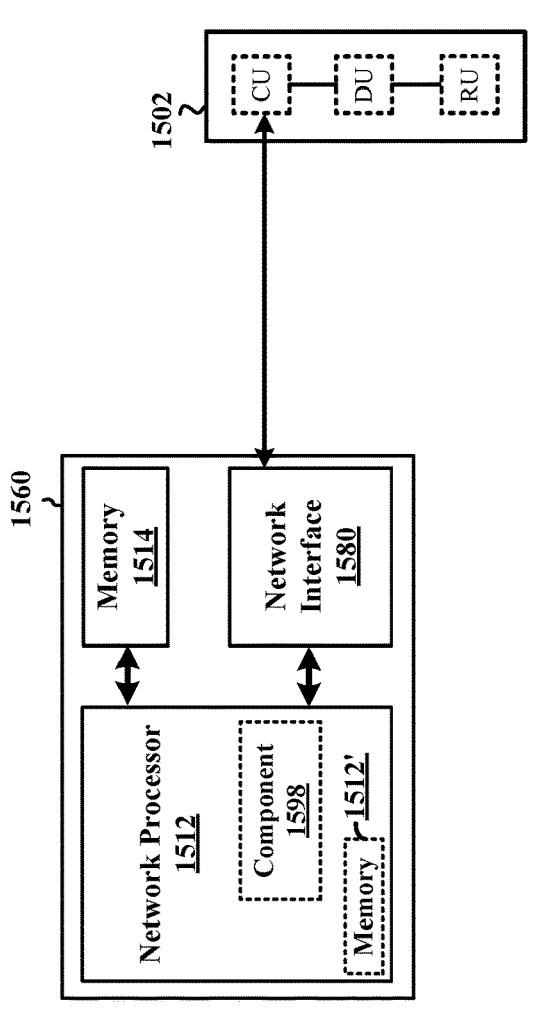
FIG. 15 is a diagram illustrating an example of a hardware implementation for an example network entity.

FIG. 15 is a diagram 1500 illustrating an example of a hardware implementation for a network entity 1560. In one example, the network entity 1560 may be within the core network 120. The network entity 1560 may include at least one network processor 1512. The network processor(s) 1512 may include on-chip memory 1512'. In some aspects, the network entity 1560 may further include additional memory modules 1514. The network entity 1560 communicates via the network interface 1580 directly (e.g., backhaul link) or indirectly (e.g., through a RIC) with the CU 1502. The on-chip memory 1512' and the additional memory modules 1514 may each be considered a computer-readable medium/memory. Each computer-readable medium/memory may be non-transitory. The network processor(s) 1512 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 1598 is configured to transmit, to a UE, an L1 or L2 mobility cell configuration for a set of cells for L1 or L2 inter-cell mobility. The set of cells may include multiple cells, and each cell in the set of cells may be able to be activated or deactivated for data and/or control transfer using L1 or L2 signaling. The component 1598 may be further configured to transmit, to the UE, L1 or L2 signaling indicating multiple activated cells. The UE may be configured to activate one or more cells in the multiple activated cells in a priority order for the data and/or control transfer using L1 or L2 signaling. The component 1598 may be within the network processor(s) 1512. The component 1598 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1560 may include a variety of components configured for various functions. In one configuration, the network entity 1560 includes means for transmitting, to a UE, an L1 or L2 mobility cell configuration for a set of cells for L1 or L2 inter-cell mobility. The set of cells may include multiple cells, and each cell in the set of cells may be able to be activated or deactivated for data and/or control transfer using L1 or L2 signaling. The network entity 1560 may further include means for transmitting, to the UE, L1 or L2 signaling indicating multiple activated cells. The UE may be configured to activate one or more cells in the multiple activated cells in a priority order for the data and/or control transfer using L1 or L2 signaling. The network entity 1560 may further include means for performing any of the aspects described in connection with the flowcharts in FIGS. 11 and 12, and/or the aspects performed by the SpCell in FIG. 8. The means may be the component 1598 of the network entity 1560 configured to perform the functions recited by the means.

This disclosure provides a method for wireless communication at a UE. The method may include receiving, from a network entity, an L1 or L2 mobility cell configuration for a set of cells for L1 or L2 inter-cell mobility. The set of cells may include multiple cells, and each cell in the set of cells is able to be activated or deactivated for data and/or control transfer using L1 or L2 signaling. The method may further include receiving, from the network entity, L1 or L2 signaling indicating multiple activated cells; and activating one or more cells in the multiple activated cells in a priority order for the data and/or control transfer using L1 or L2 signaling. The method provides configuration, cell activation or deactivation in an optimized order, and associated signaling to enable L1/L2 mobility for more efficient and robust mobility management. By activating the cells according to the optimized activation order, a UE may activate the most important cell first, which brings benefits such as improved quality of services, enhanced user experience, improved latency, and reduced power consumption.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving, from a network entity, an L1 or L2 mobility cell configuration for a set of cells for L1 or L2 inter-cell mobility, the set of cells comprising multiple cells, where each cell in the set of cells is able to be activated or deactivated for data and/or control transfer using L1 or L2 signaling; receiving, from the network entity, L1 or L2 signaling indicating multiple activated cells; and activating one or more cells in the multiple activated cells in a priority order for the data and/or control transfer using L1 or L2 signaling.

Aspect 2 is the method of aspect 1, where the multiple activated cells include at least one of: an SpCell or at least one SCell, and activating the one or more cells in the priority order includes: activating the SpCell before activating the at least one SCell.

Aspect 3 is the method of aspect 2, where the L1 or L2 signaling further indicates at least one of: a bitmap indicating the multiple activated cells and one or more deactivated cells from the set of cells, a TRS ID for each of the one or more cells in the multiple activated cells, a cell ID for the SpCell, or an SpCell configuration ID for SpCell configuration.

Aspect 4 is the method of aspect 3, where the L1 or L2 signaling is in a MAC-CE or DCI.

Aspect 5 is the method of aspect 3, where the L1 or L2 signaling is included in a message that includes the number of octets corresponding to the first maximum number of cells configured for the data and/or control transfer using L1 or L2 signaling, the overall number of cells configured for the data and/or control transfer using L1 or L2 signaling, or the second maximum number of cells that can be configured for the data and/or control transfer using L1 or L2 signaling for the UE.

Aspect 6 is the method of aspect 3, where the multiple activated cells include one or more SCells, and activating the one or more cells in the priority order includes: activating the one or more SCells in an order based on an SCell index of each SCell.

Aspect 7 is the method of aspect 3, where the multiple activated cells include one or more SCells, and activating the one or more cells in the priority order includes: activating the one or more SCells in an order based on a priority configuration indicating a priority level for each SCell.

Aspect 8 is the method of aspect 7, where the method further includes: receiving, through an RRC signaling, the priority configuration indicating the priority level for each SCell.

Aspect 9 is the method of aspect 7, where the priority configuration includes multiple priority levels for each SCell, the L1 or L2 signaling includes an indication of one priority level of the multiple priority levels, and where activating the one or more cells in the priority order includes: activating the one or more SCells in an order based on the one priority level of the multiple priority levels for each SCell.

Aspect 10 is the method of aspect 7, where the priority configuration includes multiple priority levels for each SCell, and where activating the one or more cells in the priority order includes: activating the one or more SCells in an order based on one priority level of the multiple priority levels for each SCell, where the one priority level of the multiple priority levels for each SCell is indicated as a separate signal.

Aspect 11 is the method of aspect 3, where the multiple activated cells include one or more SCells, and activating the one or more cells in the priority order includes: activating the one or more SCells in an order based on a priority group ID for each SCell.

Aspect 12 is the method of aspect 11, where the method further includes: receiving, through a radio resource control (RRC) signaling, the priority group ID for each SCell.

Aspect 13 is the method of any of aspects 1 to 12, where the method further includes: sending, in response to receiving the L1 or L2 signaling, an SR to each of the multiple activated cells, or sending, in response to receiving the L1 or L2 signaling, an acknowledgment to the current SpCell or one of the one or more activated cells.

Aspect 14 is a method for wireless communication at a network entity, including: transmitting, to a UE, an L1 or L2 mobility cell configuration for a set of cells for L1 or L2 inter-cell mobility, the set of cells comprising multiple cells, where each cell in the set of cells is able to be activated or deactivated for data and/or control transfer using L1 or L2 signaling; and transmitting, to the UE, L1 or L2 signaling indicating multiple activated cells, where the UE is configured to activate one or more cells in the multiple activated cells in a priority order for the data and/or control transfer using L1 or L2 signaling.

Aspect 15 is the method of aspect 14, where the multiple activated cells include at least one of: an SpCell, or at least one SCell, and, to activate one or more cells in the multiple activated cells in the priority order, the UE is configured to: activate the SpCell before activating the at least one SCell.

Aspect 16 is the method of aspect 15, where the L1 or L2 signaling further indicates at least one of: a bitmap indicating the multiple activated cells and one or more deactivated cells from the set of cells, a TRS ID for each of the one or more cells in the multiple activated cells, a cell ID for the SpCell, or an SpCell configuration ID for SpCell configuration.

Aspect 17 is the method of aspect 16, where the L1 or L2 signaling is in a MAC-CE or DCI.

Aspect 18 is the method of aspect 16, where the L1 or L2 signaling is included in a message that includes the number of octets corresponding to the first maximum number of cells configured for the data and/or control transfer using L1 or L2 signaling, the overall number of cells configured for the data and/or control transfer using L1 or L2 signaling, or the second maximum number of cells that can be configured for the data and/or control transfer using L1 or L2 signaling for the UE.

Aspect 19 is the method of aspect 16, where the multiple activated cells include one or more SCells activated in the priority order based on an SCell index of each SCell.

Aspect 20 is the method of aspect 16, where the multiple activated cells include one or more SCells activated in the priority order based on a priority configuration indicating a priority level for each SCell.

Aspect 21 is the method of aspect 20, where the method further includes: transmitting, to the UE, through an RRC signaling, the priority configuration indicating the priority level for each SCell.

Aspect 22 is the method of aspect 20, where the priority configuration includes multiple priority levels for each SCell, the L1 or L2 signaling includes an indication of one priority level of the multiple priority levels for activation of the one or more cells in the multiple activated cells in the priority order based on the one priority level of the multiple priority levels for each SCell.

Aspect 23 is the method of aspect 16, where the priority configuration includes multiple priority levels for each SCell for activation of the one or more SCells in the priority order based on one priority level of the multiple priority levels for each SCell, where the one priority level of the multiple priority levels for each SCell is indicated as a separate signal.

Aspect 24 is the method of aspect 16, where the multiple activated cells include one or more SCells activated in the priority order based on a priority group ID for each SCell.

Aspect 25 is the method of aspect 24, where the method further includes: transmitting, through an RRC signaling, the priority group ID for each SCell.

Aspect 26 is the method of any of aspects 14 to 25, where the method further includes: receiving, from the UE, after transmitting the L1 or L2 signaling, an acknowledgment indicating a successful new cell activation.

Aspect 27 is an apparatus for wireless communication at a wireless device, including: at least one memory; and at least one processor coupled to the at least one memory and, based at least in part on information stored in the at least one memory, the at least one processor, individually or in combination, is configured to cause the wireless device to perform the method of any of aspects 1-13.

Aspect 28 is the apparatus of aspect 27, further including at least one of a transceiver or an antenna coupled to the at least one processor.

Aspect 29 is an apparatus for wireless communication including means for implementing the method of any of aspects 1-13.

Aspect 30 is a computer-readable medium (e.g., a non-transitory computer-readable medium) storing computer-executable code, where the code, when executed by a processor, causes the processor to implement the method of any of aspects 1-13.

Aspect 31 is an apparatus for wireless communication at a network entity, including: at least one memory; and at least one processor coupled to the at least one memory and, based at least in part on information stored in the at least one memory, the at least one processor, individually or in combination, is configured to cause the network entity to perform the method of any of aspects 14-26.

Aspect 32 is the apparatus of aspect 31, further including at least one of a transceiver or an antenna coupled to the at least one processor.

Aspect 33 is an apparatus for wireless communication including means for implementing the method of any of aspects 14-26.

Aspect 34 is a computer-readable medium (e.g., a non-transitory computer-readable medium) storing computer-executable code, where the code, when executed by a processor, causes the processor to implement the method of any of aspects 14-26.

What is claimed is:

1. An apparatus for wireless communication at a user equipment (UE), comprising:

at least one memory; and at least one processor coupled to the at least one memory and, based at least in part on information stored in the at least one memory, the at least one processor, individually or in any combination, is configured to cause the UE to:

receive, from a network entity, a layer 1 (L1) or layer 2 (L2) mobility cell configuration for a set of cells for L1 or L2 inter-cell mobility, the set of cells comprising multiple cells, wherein each cell in the set of cells is able to be activated or deactivated for data and/or control transfer using L1 or L2 signaling;

receive, from the network entity, the L1 or L2 signaling indicating multiple activated cells; and activate one or more cells in the multiple activated cells in a priority order for the data and/or control transfer using the L1 or L2 signaling, wherein the multiple activated cells include at least one of: a special cell (SpCell), or at least one secondary cell (SCell), and wherein, to activate the one or more cells in the priority order, the at least one processor, individually or in any combination, is configured to cause the UE to: activate the SpCell before activating the at least one SCell, wherein the L1 or L2 signaling further indicates at least one of:

a bitmap indicating the multiple activated cells and one or more deactivated cells from the set of cells, a tracking reference signal (TRS) ID for each of the one or more cells in the multiple activated cells, a cell ID for the SpCell, or an SpCell configuration ID for SpCell configuration, and wherein the L1 or L2 signaling is comprised in a message that includes a number of octets corresponding to a first maximum number of cells configured for the data and/or control transfer using the L1 or L2 signaling, an overall number of cells configured for the data and/or control transfer using the L1 or L2 signaling, or a second maximum number of cells configured for the data and/or control transfer using the L1 or L2 signaling for the UE.

2. The apparatus of claim 1, wherein the L1 or L2 signaling is in a medium access control-control element (MAC-CE) or downlink control information (DCI).

3. The apparatus of claim 1, wherein the multiple activated cells include one or more SCells, and wherein, to activate the one or more cells in the priority order, the at least one processor, individually or in any combination, is configured to cause the UE to:

activate the one or more SCells in an order based on an SCell index of each SCell.

4. The apparatus of claim 1, wherein the multiple activated cells include one or more SCells, and wherein, to activate the one or more cells in the priority order, the at least one processor, individually or in any combination, is configured to cause the UE to:

activate the one or more SCells in an order based on a priority configuration indicating a priority level for each SCell.

5. The apparatus of claim 4, wherein the at least one processor, individually or in any combination, is further configured to cause the UE to:

receive, through a radio resource control (RRC) signaling, the priority configuration indicating the priority level for each SCell.

6. The apparatus of claim 4, wherein the priority configuration includes multiple priority levels for each SCell, the L1 or L2 signaling includes an indication of one priority level of the multiple priority levels, and wherein, to activate the one or more cells in the priority order, the at least one processor, individually or in any combination, is configured to cause the UE to:

activate the one or more SCells in the order based on the one priority level of the multiple priority levels for each SCell.

7. The apparatus of claim 4, wherein the priority configuration includes multiple priority levels for each SCell, and wherein, to activate the one or more cells in the priority order, the at least one processor, individually or in any combination, is configured to cause the UE to:

activate the one or more SCells in the order based on one priority level of the multiple priority levels for each SCell, wherein the one priority level of the multiple priority levels for each SCell is indicated as a separate signal.

8. The apparatus of claim 1, wherein the multiple activated cells include one or more SCells, and wherein, to activate the one or more cells in the priority order, the at least one processor, individually or in any combination, is configured to cause the UE to:

activate the one or more SCells in an order based on a priority group ID for each SCell.

9. The apparatus of claim 8, wherein the at least one processor, individually or in any combination, is further configured to cause the UE to:

receive, through a radio resource control (RRC) signaling, the priority group ID for each SCell.

10. The apparatus of claim 1, wherein the at least one processor, individually or in any combination, is further configured to cause the UE to:

send, in response to receiving the L1 or L2 signaling, a scheduling request (SR) to each of the multiple activated cells, or send, in response to receiving the L1 or L2 signaling, an acknowledgment to a current SpCell or one of the one or more activated cells.

11. The apparatus of claim 1, further comprising at least one of a transceiver or an antenna coupled to the at least one processor, wherein the at least one processor is configured to cause the UE to receive the L1 or L2 signaling via a MAC-CE or DCI via at least one of the transceiver or the antenna.

12. An apparatus for wireless communication at a network entity, comprising:

at least one memory; and at least one processor coupled to the at least one memory and, based at least in part on information stored in the at least one memory, the at least one processor, individually or in any combination, is configured to cause the network entity to:

transmit, to a user equipment (UE), a layer 1 (L1) or layer 2 (L2) mobility cell configuration for a set of cells for L1 or L2 inter-cell mobility, the set of cells comprising multiple cells, wherein each cell in the set of cells is able to be activated or deactivated for data and/or control transfer using L1 or L2 signaling; and transmit, to the UE, the L1 or L2 signaling indicating multiple activated cells, wherein the UE is configured to activate one or more cells in the multiple activated cells in a priority order for the data and/or control transfer using the L1 or L2 signaling, wherein the multiple activated cells include at least one of: a special cell (SpCell), or at least one secondary cell (SCell), and wherein the one or more cells in the multiple activated cells in the priority order are activated by the SpCell that is activated before activation of the at least one SCell, wherein the L1 or L2 signaling further indicates at least one of:

a bitmap indicating the multiple activated cells and one or more deactivated cells from the set of cells, a tracking reference signal (TRS) ID for each of the one or more cells in the multiple activated cells, a cell ID for the SpCell, or an SpCell configuration ID for SpCell configuration, and wherein the L1 or L2 signaling is comprised in a message that includes a number of octets corresponding to a first maximum number of cells configured for the data and/or control transfer using the L1 or L2 signaling, an overall number of cells configured for the data and/or control transfer using the L1 or L2 signaling, or a second maximum number of cells configured for the data and/or control transfer using the L1 or L2 signaling for the UE.

13. The apparatus of claim 12, wherein the L1 or L2 signaling is in a medium access control-control element (MAC-CE) or downlink control information (DCI).

14. The apparatus of claim 12, wherein the multiple activated cells include one or more SCells activated in the priority order based on an SCell index of each SCell.

15. The apparatus of claim 12, wherein the multiple activated cells include one or more SCells activated in the priority order based on a priority configuration indicating a priority level for each SCell.

16. The apparatus of claim 15, wherein the at least one processor, individually or in any combination, is further configured to cause the network entity to:

transmit, to the UE, through a radio resource control (RRC) signaling, the priority configuration indicating the priority level for each SCell.

17. The apparatus of claim 15, wherein the priority configuration includes multiple priority levels for each SCell, the L1 or L2 signaling includes an indication of one priority level of the multiple priority levels for activation of the one or more cells in the multiple activated cells in the priority order based on the one priority level of the multiple priority levels for each SCell.

18. The apparatus of claim 15, wherein the priority configuration includes multiple priority levels for each SCell for activation of the one or more SCells in the priority order based on one priority level of the multiple priority levels for each SCell, wherein the one priority level of the multiple priority levels for each SCell is indicated as a separate signal.

19. The apparatus of claim 12, wherein the multiple activated cells include one or more SCells activated in the priority order based on a priority group ID for each SCell.

20. The apparatus of claim 19, wherein the at least one processor, individually or in any combination, is further configured to cause the network entity to:

transmit, through a radio resource control (RRC) signaling, the priority group ID for each SCell.

21. The apparatus of claim 12, wherein the at least one processor, individually or in any combination, is further configured to cause the network entity to:

receive, from the UE, after transmitting the L1 or L2 signaling, an acknowledgment indicating a successful new cell activation.

22. The apparatus of claim 12, further comprising at least one of a transceiver or an antenna coupled to the at least one processor, wherein at least one of the transceiver or the antenna is configured to transmit the L1 or L2 signaling via a MAC-CE or DCI.

23. A method for wireless communication at a user equipment (UE), comprising:

receiving, from a network entity, a layer 1 (L1) or layer 2 (L2) mobility cell configuration for a set of cells for L1 or L2 inter-cell mobility, the set of cells comprising multiple cells, wherein each cell in the set of cells is able to be activated or deactivated for data and/or control transfer using L1 or L2 signaling;

receiving, from the network entity, the L1 or L2 signaling indicating multiple activated cells; and activating one or more cells in the multiple activated cells in a priority order for the data and/or control transfer using the L1 or L2 signaling, wherein the multiple activated cells include at least one of: a special cell (SpCell), or at least one secondary cell (SCell), and wherein the one or more cells in the priority order are activated by activating the SpCell before activating the at least one SCell, wherein the L1 or L2 signaling further indicates at least one of:

a bitmap indicating the multiple activated cells and one or more deactivated cells from the set of cells, a tracking reference signal (TRS) ID for each of the one or more cells in the multiple activated cells, a cell ID for the SpCell, or an SpCell configuration ID for SpCell configuration, and wherein the L1 or L2 signaling is comprised in a message that includes a number of octets corresponding to a first maximum number of cells configured for the data and/or control transfer using the L1 or L2 signaling, an overall number of cells configured for the data and/or control transfer using the L1 or L2 signaling, or a second maximum number of cells configured for the data and/or control transfer using the L1 or L2 signaling for the UE.

24. The method of claim 23, wherein the multiple activated cells include one or more SCells, and wherein the one or more cells in the priority order are activated by activating the one or more SCells in an order based on an SCell index of each SCell.

25. The method of claim 23, wherein the multiple activated cells include one or more SCells, and wherein the one or more cells in the priority order are activated by activating the one or more SCells in an order based on a priority configuration indicating a priority level for each SCell.

26. The method of claim 25, further comprising:

receiving, through a radio resource control (RRC) signaling, the priority configuration indicating the priority level for each SCell.

27. A method for wireless communication at a network entity, comprising:

transmitting, to a user equipment (UE), a layer 1 (L1) or layer 2 (L2) mobility cell configuration for a set of cells for L1 or L2 inter-cell mobility, the set of cells comprising multiple cells, wherein each cell in the set of cells is able to be activated or deactivated for data and/or control transfer using L1 or L2 signaling; and transmitting, to the UE, the L1 or L2 signaling indicating multiple activated cells, wherein the UE is configured to activate one or more cells in the multiple activated cells in a priority order for the data and/or control transfer using the L1 or L2 signaling, wherein the multiple activated cells include at least one of: a special cell (SpCell), or at least one secondary cell (SCell), and wherein the one or more cells in the multiple activated cells in the priority order are activated by the SpCell that is activated before activation of the at least one SCell, wherein the L1 or L2 signaling further indicates at least one of:

a bitmap indicating the multiple activated cells and one or more deactivated cells from the set of cells, a tracking reference signal (TRS) ID for each of the one or more cells in the multiple activated cells, a cell ID for the SpCell, or an SpCell configuration ID for SpCell configuration, and wherein the L1 or L2 signaling is comprised in a message that includes a number of octets corresponding to a first maximum number of cells configured for the data and/or control transfer using the L1 or L2 signaling, an overall number of cells configured for the data and/or control transfer using the L1 or L2 signaling, or a second maximum number of cells configured for the data and/or control transfer using the L1 or L2 signaling for the UE.

28. The method of claim 27, wherein the multiple activated cells include one or more SCells activated in the priority order based on an SCell index of each SCell.

29. The method of claim 27, wherein the multiple activated cells include one or more SCells activated in the priority order based on a priority configuration indicating a priority level for each SCell.

30. The method of claim 29, further comprising:

transmitting, to the UE, through a radio resource control (RRC) signaling, the priority configuration indicating the priority level for each SCell.

* * * * *